US010578828B2

(12) United States Patent
Lee et al.

(10) Patent No.: US 10,578,828 B2
(45) Date of Patent: Mar. 3, 2020

(54) LENS MOVING APPARATUS

(71) Applicant: LG Innotek Co., Ltd., Seoul (KR)

(72) Inventors: Jun Taek Lee, Seoul (KR); Sang Ok Park, Seoul (KR); Byung Wook Son, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 184 days.

(21) Appl. No.: 15/156,946

(22) Filed: May 17, 2016

(65) Prior Publication Data
US 2016/0259144 A1 Sep. 8, 2016

Related U.S. Application Data

(63) Continuation of application No. 14/699,459, filed on Apr. 29, 2015, now Pat. No. 9,360,653.

(30) Foreign Application Priority Data

May 9, 2014 (KR) .................. 10-2014-0055361
May 9, 2014 (KR) .................. 10-2014-0055363

(51) Int. Cl.
*G02B 7/02* (2006.01)
*G02B 15/14* (2006.01)
(Continued)

(52) U.S. Cl.
CPC .................. *G02B 7/09* (2013.01); *G02B 7/04* (2013.01); *G03B 3/10* (2013.01); *G03B 13/36* (2013.01);
(Continued)

(58) Field of Classification Search
CPC ........ G02B 7/102; G02B 15/173; G02B 7/10; G02B 7/021; G02B 7/04; G02B 7/08; G03B 3/10; G03B 17/14; G11B 7/0932
(Continued)

(56) References Cited

U.S. PATENT DOCUMENTS 4,727,529 A * 2/1988 Araki .................. G11B 7/0956
                                                       369/44.16
8,638,510 B2   1/2014 Lee et al.
(Continued)

FOREIGN PATENT DOCUMENTS

CN   101017233 A   8/2007
CN   101509996 A   8/2009
(Continued)

OTHER PUBLICATIONS

Office Action dated Sep. 22, 2015 in U.S. Appl. No. 14/699,459, filed Apr. 29, 2015.
(Continued)

*Primary Examiner* — Dawayne Pinkney
(74) *Attorney, Agent, or Firm* — Saliwanchik, Lloyd & Eisenschenk

(57) ABSTRACT

Embodiments provide a lens moving apparatus including housing to support a driving magnet, a bobbin provided at an outer circumferential surface thereof with a coil located inside the driving magnet, the bobbin being moved in a first direction parallel to an optical axis within the housing via electromagnetic interaction between the driving magnet and the coil, a lower elastic member to connect a lower portion of the housing and a lower portion of the bobbin to each other, both ends of the coil being electrically connected to the lower elastic member, the lower elastic member having a first terminal electrically connected to an external power source so as to supply external power to the ends of the coil, and a printed circuit board provided at one side surface of the housing, the printed circuit board having a second terminal electrically connected to the external power source.

23 Claims, 20 Drawing Sheets

(51) Int. Cl.
*G03B 3/10* (2006.01)
*G02B 7/09* (2006.01)
*G02B 7/04* (2006.01)
*H04N 5/225* (2006.01)
*G03B 13/36* (2006.01)
*G03B 5/00* (2006.01)

(52) U.S. Cl.
CPC ............. *H04N 5/2254* (2013.01); *G03B 5/00* (2013.01); *G03B 2205/0015* (2013.01); *G03B 2205/0069* (2013.01); *H04N 5/2253* (2013.01)

(58) Field of Classification Search
USPC ........ 359/811–830, 694, 696, 676, 699–701; 396/133, 137
See application file for complete search history.

(56) References Cited

U.S. PATENT DOCUMENTS

| | | | | |
|---|---|---|---|---|
| 2007/0177279 A1* | 8/2007 | Cho | ............... | G02B 7/102 359/692 |
| 2010/0060999 A1 | 3/2010 | Higuchi et al. | | |
| 2010/0237718 A1 | 9/2010 | Tsai et al. | | |
| 2011/0170204 A1* | 7/2011 | Park | ............... | G02B 7/023 359/824 |
| 2012/0008220 A1* | 1/2012 | Lee | ............... | G03B 3/10 359/822 |
| 2012/0082442 A1 | 4/2012 | Kwon et al. | | |
| 2012/0314307 A1* | 12/2012 | Ikushima | ............. | G02B 27/646 359/814 |
| 2013/0088607 A1* | 4/2013 | Akutsu | ................. | G03B 17/14 348/208.1 |
| 2014/0072289 A1 | 3/2014 | Lim et al. | | |
| 2015/0062421 A1 | 3/2015 | Kwon et al. | | |
| 2016/0154249 A1* | 6/2016 | Yeo | ............. | G03B 5/00 359/557 |

FOREIGN PATENT DOCUMENTS

| | | |
|---|---|---|
| CN | 101990755 A | 3/2011 |
| CN | 102340228 A | 2/2012 |
| KR | 10-2008-0010861 A | 1/2008 |

OTHER PUBLICATIONS

Notice of Allowance dated Feb. 4, 2016 in U.S. Appl. No. 14/699,459, filed Apr. 29, 2015.

* cited by examiner

LENS MOVING APPARATUS

CROSS REFERENCE TO RELATED APPLICATIONS

This application is a continuation of U.S. application Ser. No. 14/699,459, filed Apr. 29, 2015, which claims the benefit under 35 U.S.C. § 119 of Korean Patent Application Nos. 10-2014-0055361 and 10-2014-0055363, filed May 9, 2014, which are herein incorporated by reference in their entirety.

TECHNICAL FIELD

Embodiments relate to a lens moving apparatus and, more particularly, to a lens moving apparatus which may improve space efficiency of a bobbin and reduce focusing time of a lens via feedback of a displacement of the lens in the optical axis direction.

BACKGROUND

In recent years, IT products equipped with subminiature digital cameras such as, for example, cellular phones, smartphones, tablet PCs, and notebook computers, have actively been developed.

IT products equipped with conventional subminiature digital cameras incorporate a lens moving apparatus for aligning the focal distance of a lens by adjusting a distance between the lens and an image sensor that converts outside light into a digital image.

However, the conventional subminiature digital cameras require a great number of connection (e.g., soldering) points in order to receive power from an external power source. In particular, in the conventional subminiature digital cameras, the great number of connection points is not concentrically arranged at a certain region, but distributed around the subminiature digital camera, which causes a worker difficulty in performing a connection process and causes an increased time required for the connection process. In addition, the conventional subminiature digital cameras suffer from a narrow working space for connection (e.g., soldering) between a coil and an external power source in order to implement an auto-focus function.

BRIEF SUMMARY

Accordingly, the present embodiment provides a lens moving apparatus to solve problems of the related art.

Specifically, one object of the present embodiment is to provide a lens moving apparatus which facilitates a connection process between the lens moving apparatus and an external power source. In addition, another object of the present embodiment is to provide a lens moving apparatus which is capable of considerably reducing a time required for a connection process between the lens moving apparatus and an external power source.

Specifically, another object of the present embodiment is to provide a lens moving apparatus which is capable of achieving a connection working space between a coil of a bobbin and an external power source that supplies current to the coil. In addition, a further object of the present embodiment is to provide a lens moving apparatus which is capable of achieving a connection working space between a coil of a bobbin and an external power source that supplies current to the coil without increasing a manufacturing price of an upper elastic member and a lower elastic member.

In one embodiment, a lens moving apparatus includes a housing configured to support a driving magnet, a bobbin provided at an outer circumferential surface thereof with a coil located inside the driving magnet, the bobbin being moved in a first direction parallel to an optical axis within the housing via electromagnetic interaction between the driving magnet and the coil, a lower elastic member configured to connect a lower portion of the housing and a lower portion of the bobbin to each other, both ends of the coil being electrically connected to the lower elastic member, the lower elastic member having a first terminal electrically connected to an external power source so as to supply external power to the ends of the coil, and a printed circuit board provided at one side surface of the housing, the printed circuit board having a second terminal electrically connected to the external power source, wherein the first terminal and the second terminal are arranged at the same side surface of the housing so as to be oriented downward.

In another embodiment, a lens moving apparatus includes a housing configured to support a driving magnet, a bobbin provided at an outer circumferential surface thereof with a coil located inside the driving magnet, the bobbin being moved in a first direction parallel to an optical axis within the housing via electromagnetic interaction between the driving magnet and the coil, an upper lower elastic member and a lower elastic member configured to connect the housing and the bobbin to each other, both ends of the coil being electrically connected respectively to the upper elastic member and the lower elastic member, and a printed circuit board provided at one side surface of the housing, the printed circuit board having an input terminal and an output terminal electrically connected to an external power source, wherein the upper elastic member is electrically connected to one terminal among the input terminal and the output terminal and the lower elastic member is electrically connected to the other terminal among the input terminal and the output terminal.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1A:
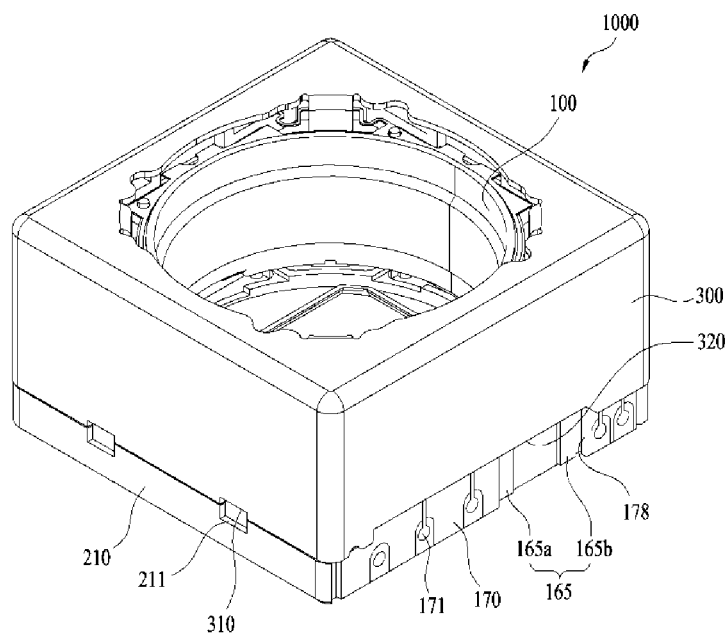
FIGS. 1A and 1B are schematic perspective views illustrating a lens moving apparatus according to respective embodiments.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciated that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Figure 1B:
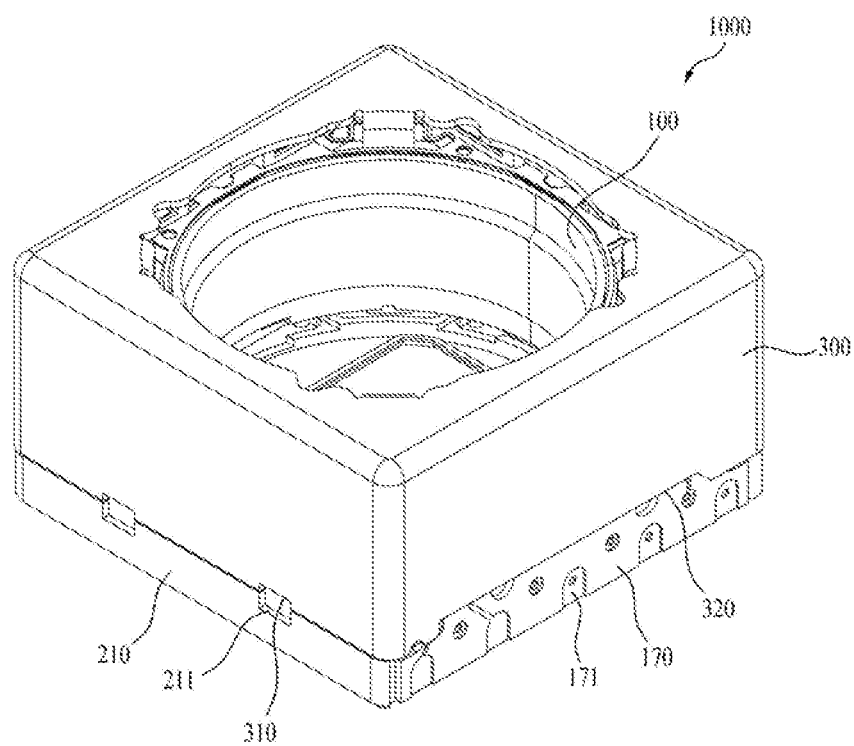
Figure 2A:
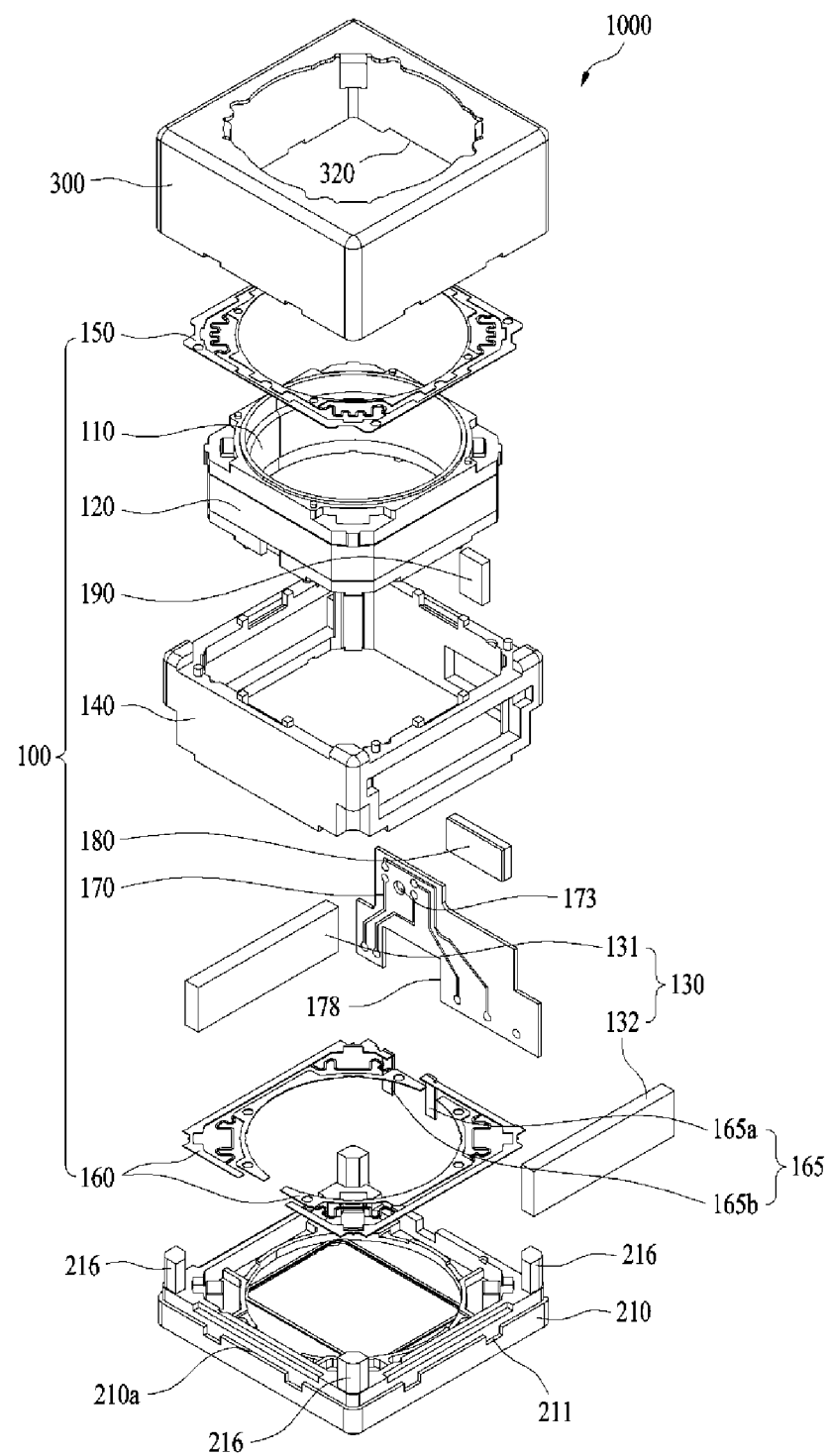
FIGS. 2A and 2B are schematic exploded perspective views illustrating the lens moving apparatus according to the respective embodiments.
Figure 2B:
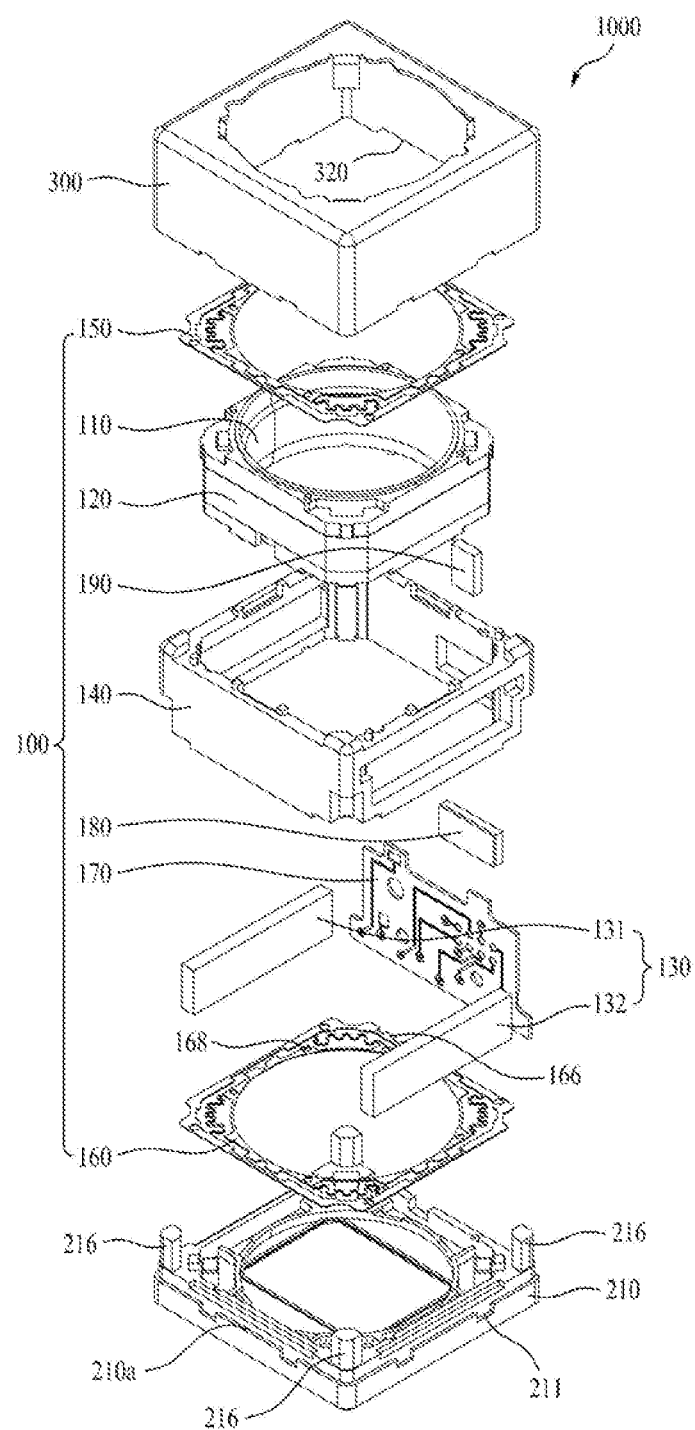
Figure 3A:
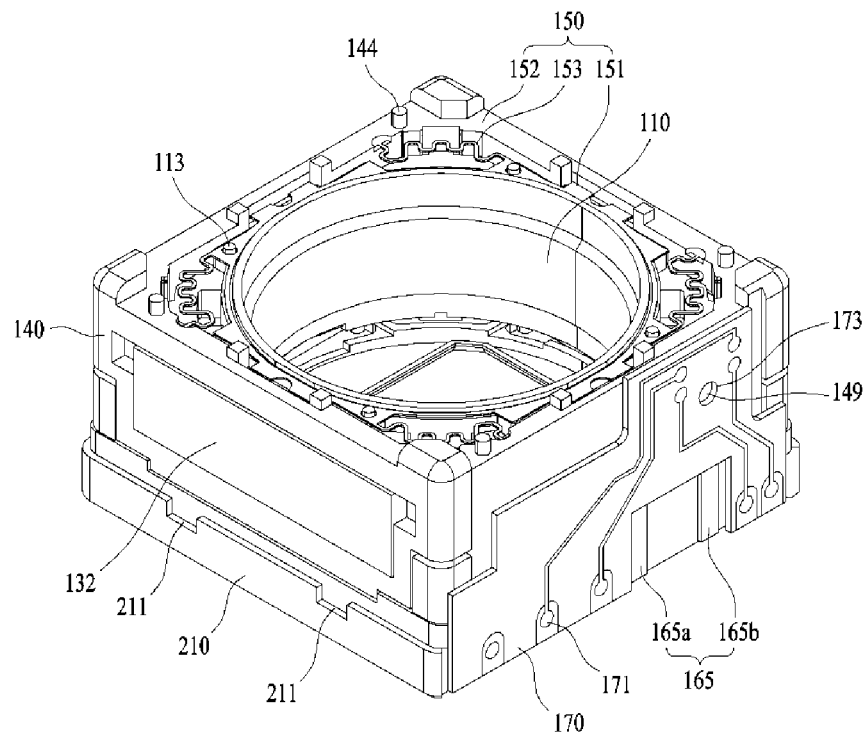
FIG. 3A is a schematic perspective view illustrating the lens moving apparatus after removal of a cover member as compared to FIG. 1A.
Figure 3B:
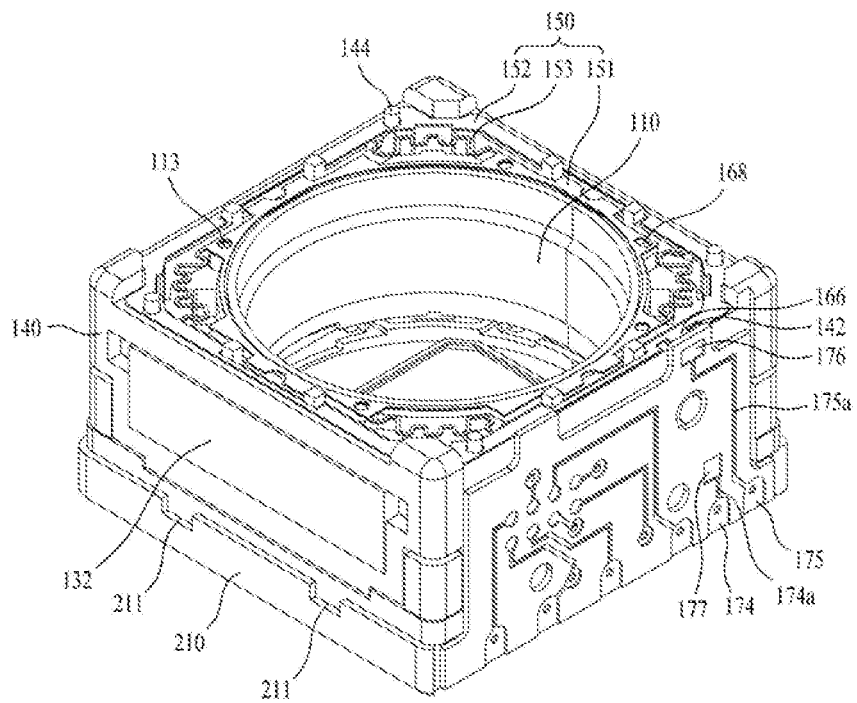
FIG. 3B is a schematic perspective view illustrating the lens moving apparatus after removal of a cover member as compared to FIG. 1B.
Figure 4A:
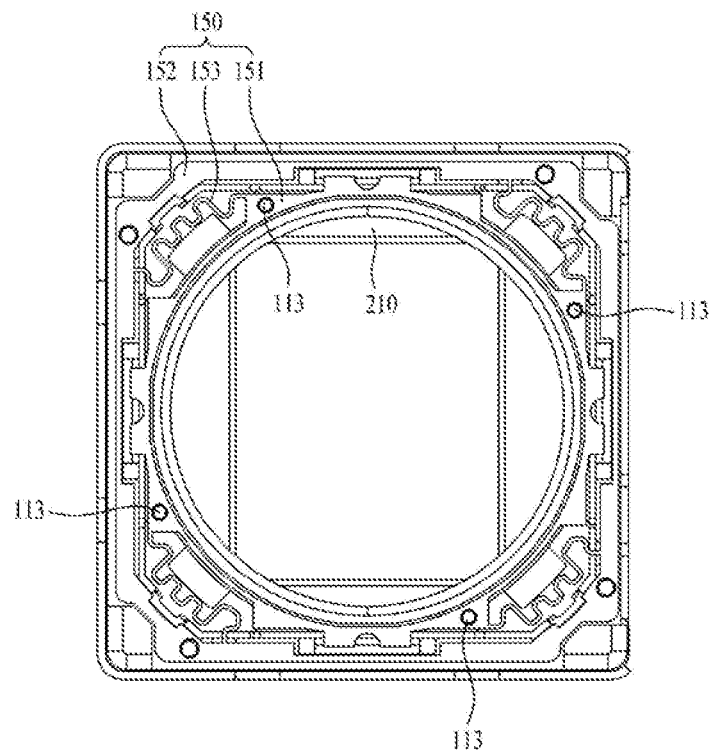
FIG. 4A is a schematic plan view of FIG. 3A.
Figure 4B:
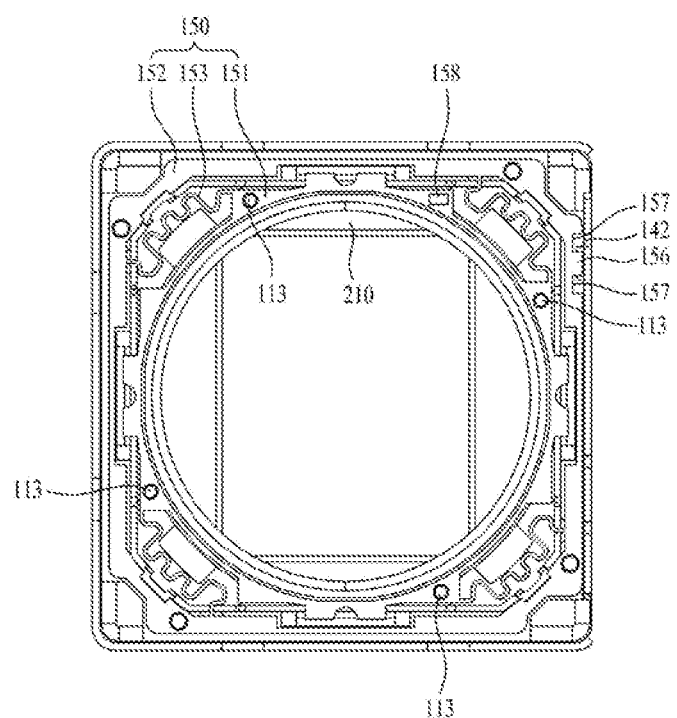
FIG. 4B is a schematic plan view of FIG. 3B.
Figure 5A:
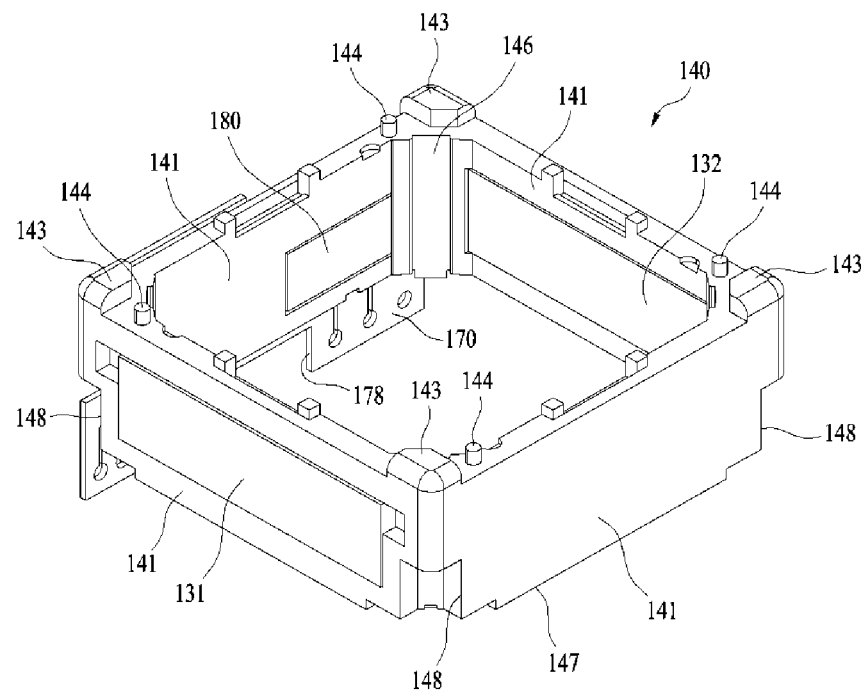
FIGS. 5A and 5B are schematic perspective views illustrating a housing according to the respective embodiments.
Figure 5B:
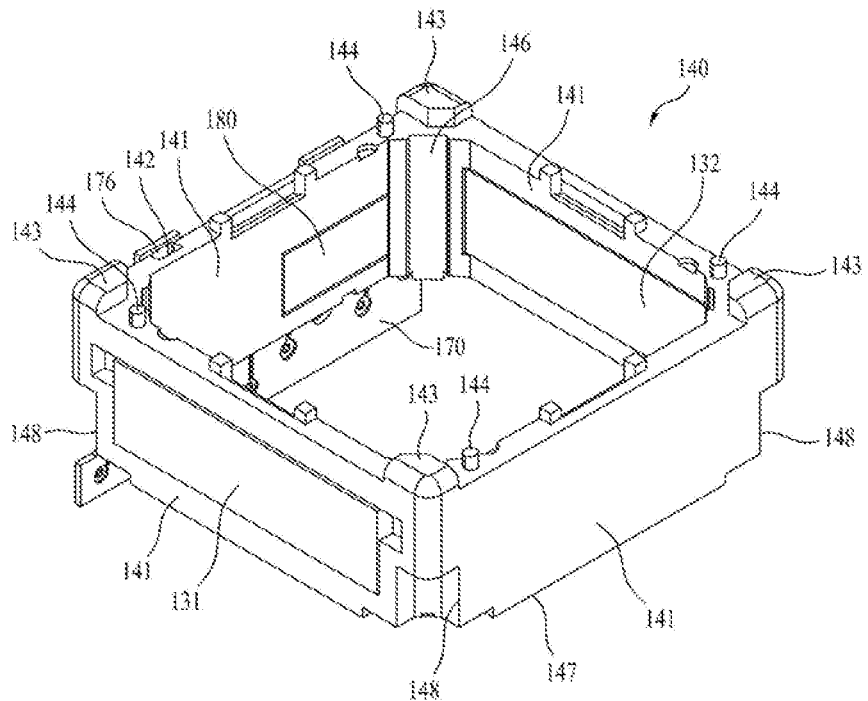
Figure 6A:
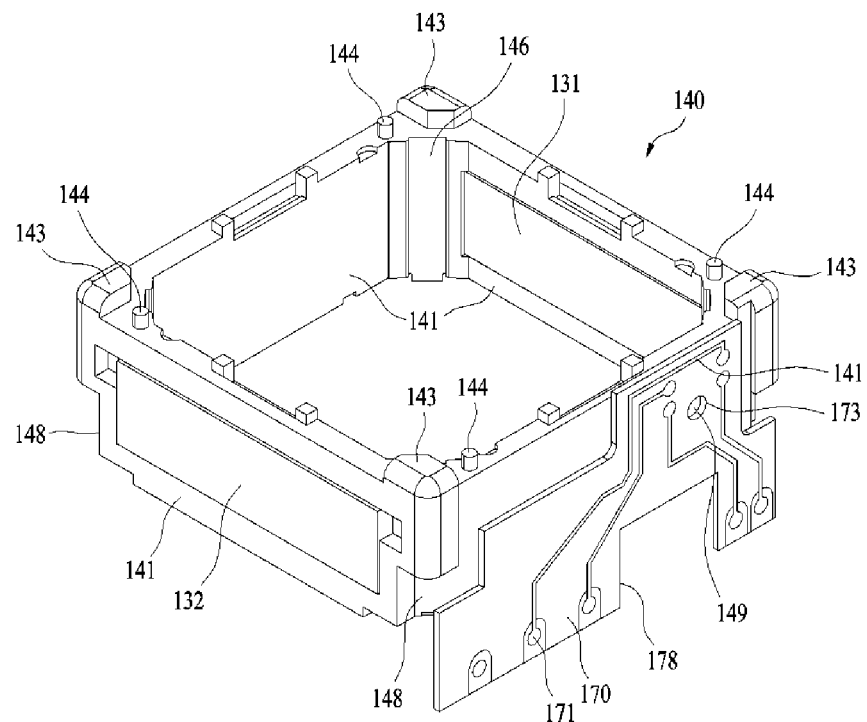
FIG. 6A is a schematic perspective view illustrating the housing viewed from a different angle than FIG. 5A.
Figure 6B:
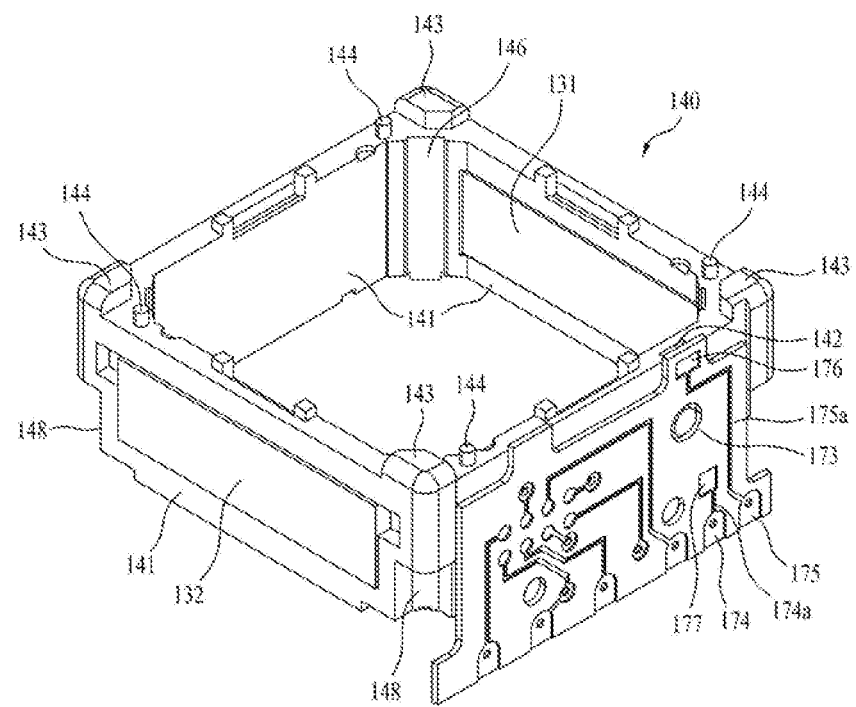
FIG. 6B is a schematic perspective view illustrating the housing viewed from a different angle than FIG. 5B.
Figure 7A:
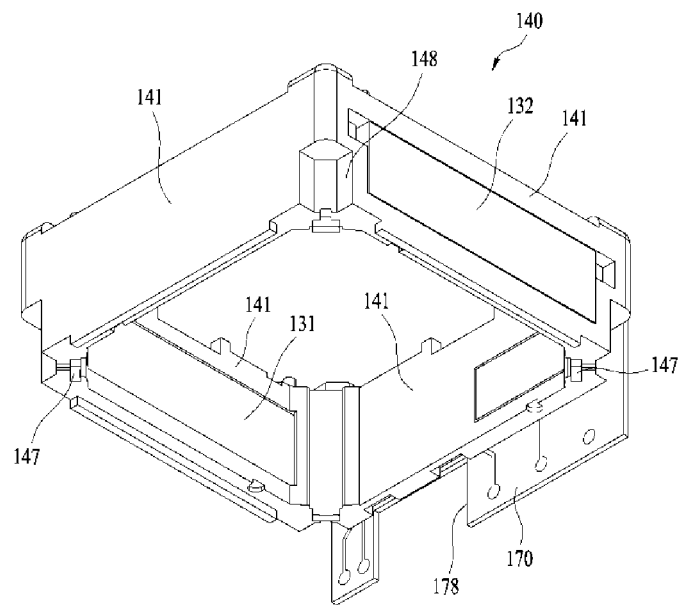
FIGS. 7A and 7B are schematic bottom perspective views illustrating the housing according to the respective embodiments.
Figure 7B:
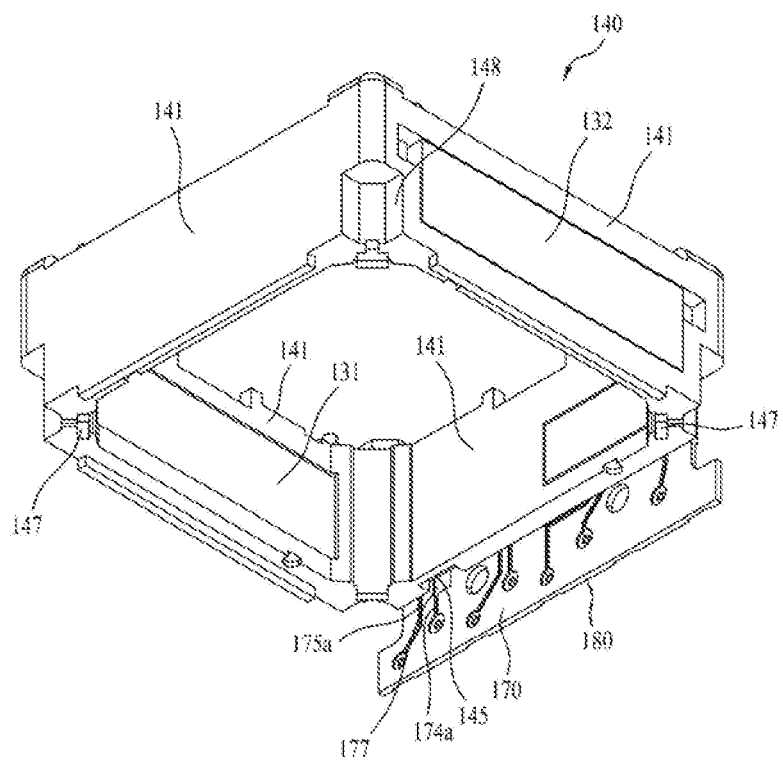
Figure 8A:
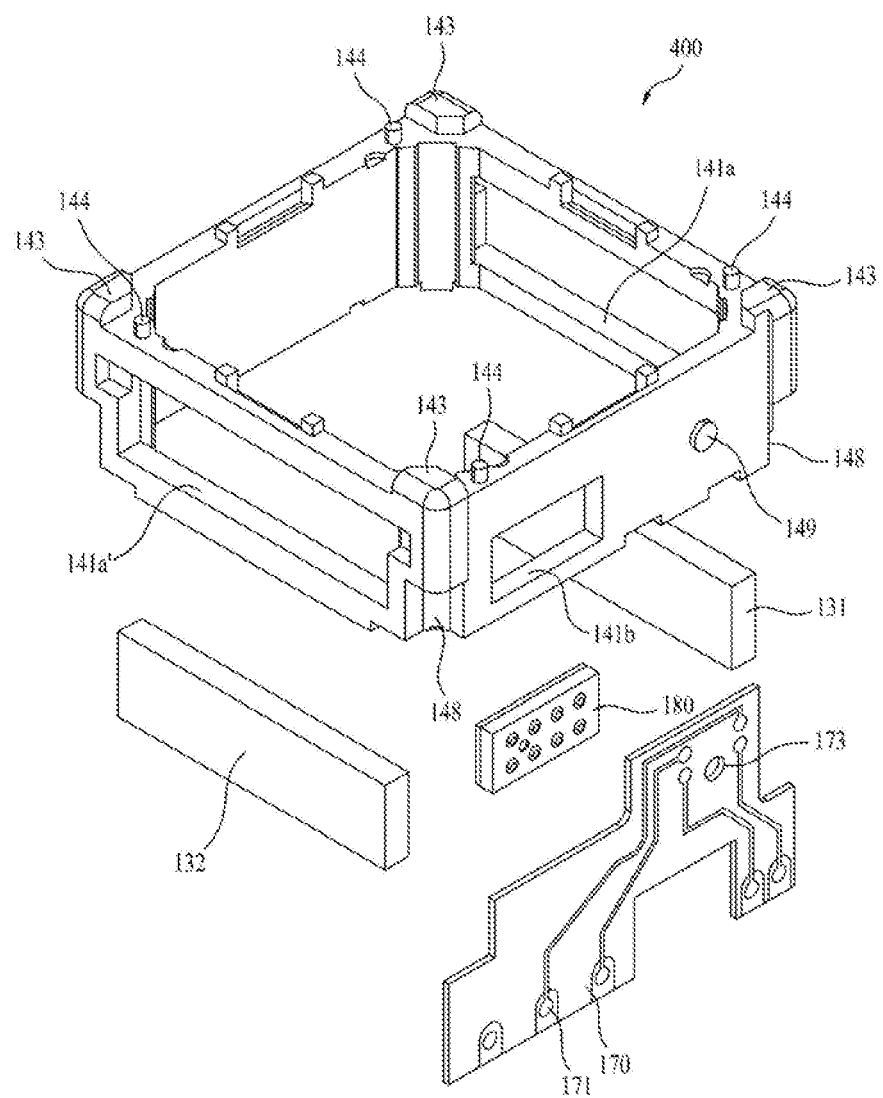
FIGS. 8A and 8B are schematic exploded perspective views illustrating the housing according to the respective embodiments.
Figure 8B:
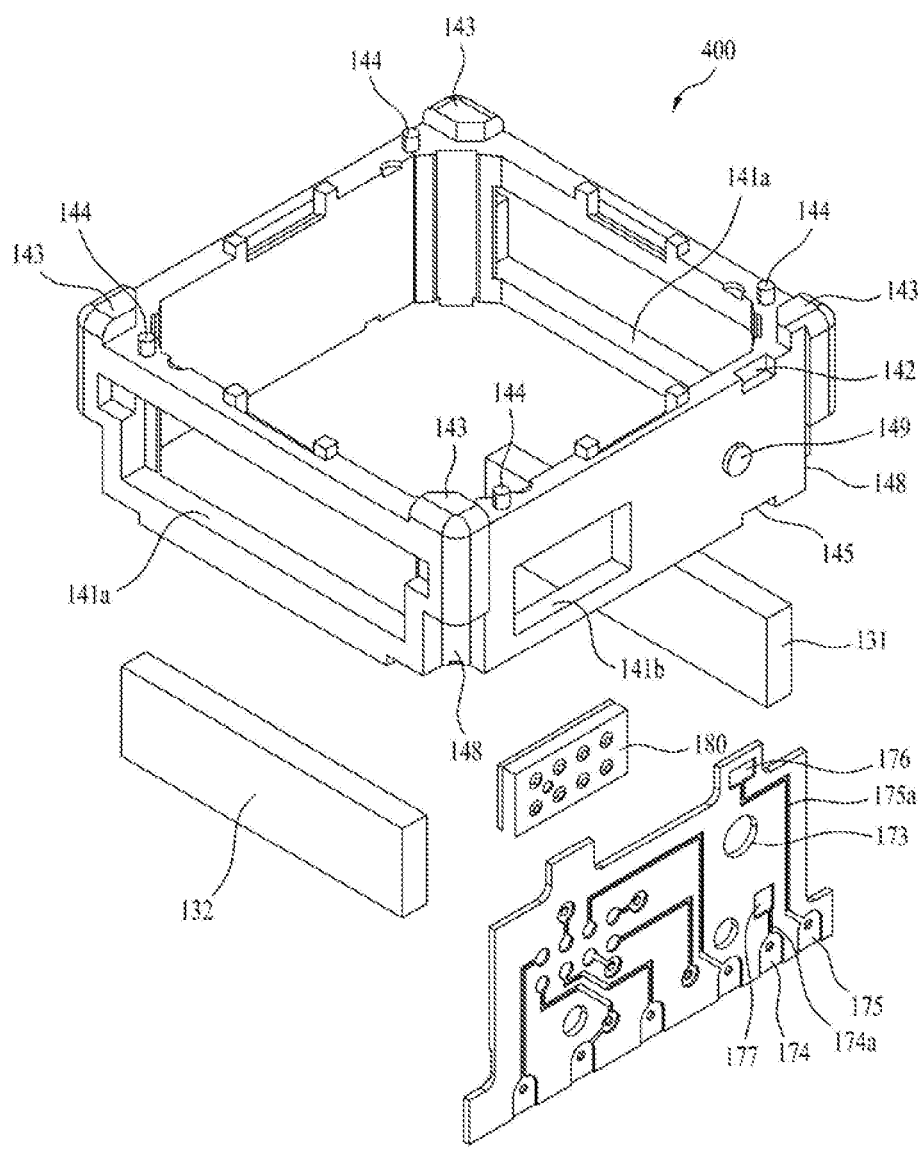
Figure 9:
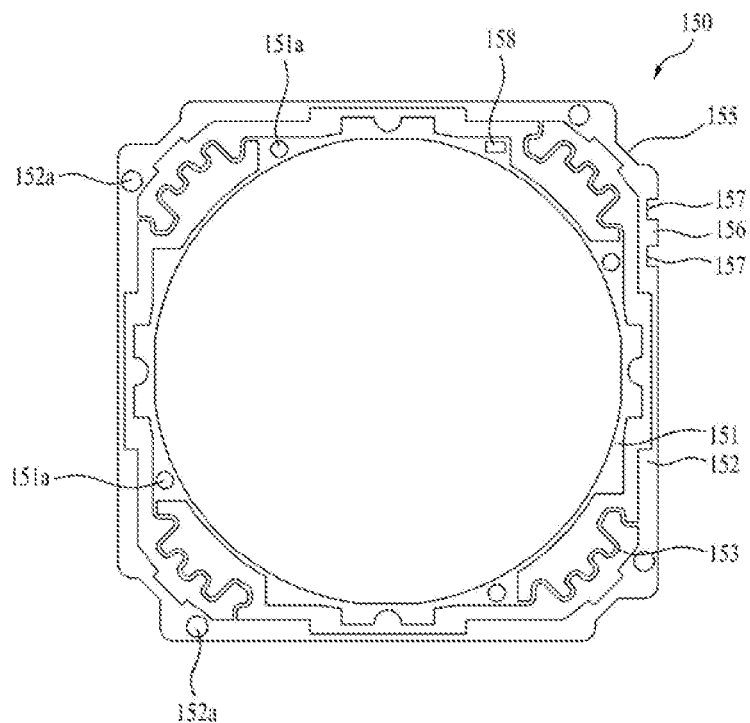
FIG. 9 is a schematic plan view illustrating an upper elastic member according to one embodiment.
Figure 10A:
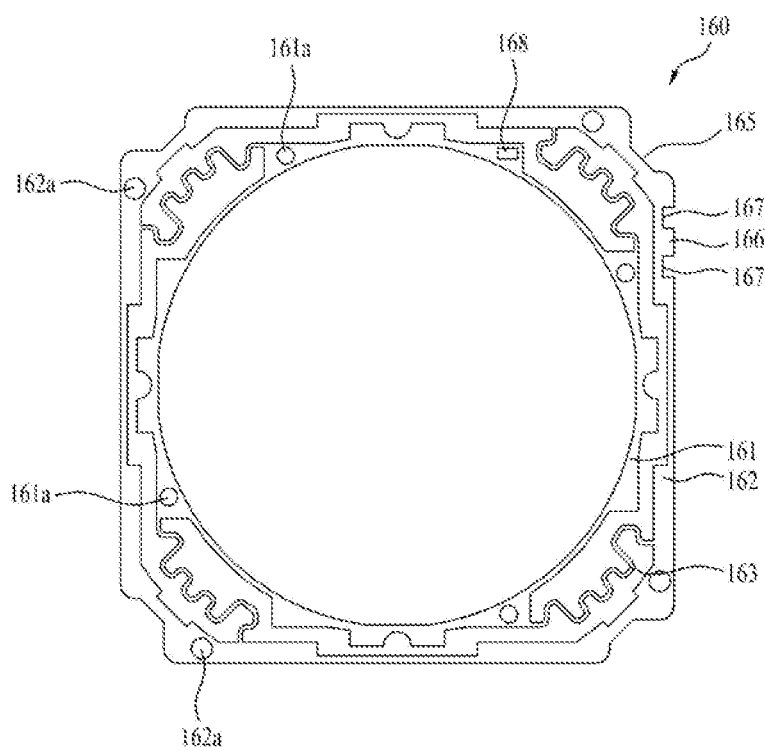
FIGS. 10A and 10B are schematic plan views illustrating the lower elastic member according to one embodiment.
Figure 10B:
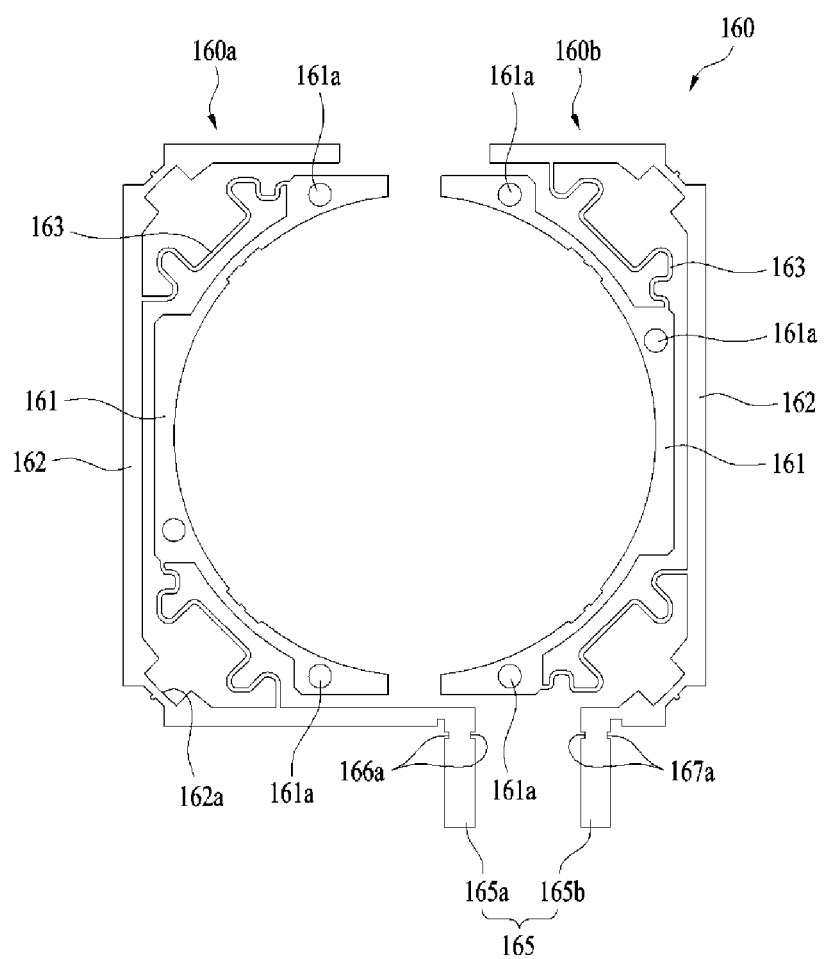
Figure 11:
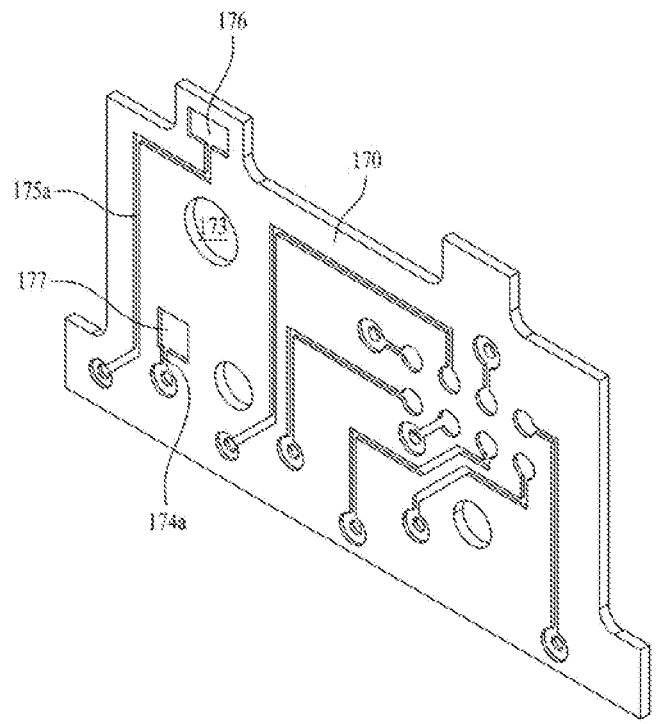
FIG. 11 is a schematic perspective view illustrating a printed circuit board according to one embodiment.

FIGS. 1A and 1B are schematic perspective views illustrating a lens moving apparatus according to respective embodiments, FIGS. 2A and 2B are schematic exploded perspective views illustrating the lens moving apparatus according to the respective embodiments, FIG. 3A is a schematic perspective view illustrating the lens moving apparatus after removal of a cover member as compared to FIG. 1A, FIG. 3B is a schematic perspective view illustrating the lens moving apparatus after removal of a cover member as compared to FIG. 1B, FIG. 4A is a schematic plan view of FIG. 3A, FIG. 4B is a schematic plan view of FIG. 3B, FIGS. 5A and 5B are schematic perspective views illustrating a housing according to the respective embodiments, FIG. 6A is a schematic perspective view illustrating the housing viewed from a different angle than FIG. 5A, FIG. 6B is a schematic perspective view illustrating the housing viewed from a different angle than FIG. 5B, FIGS. 7A and 7B are schematic bottom perspective views illustrating the housing according to the respective embodiments, FIGS. 8A and 8B are schematic exploded perspective views illustrating the housing according to the respective embodiments, FIG. 9 is a schematic plan view illustrating an upper elastic member according to the embodiment, FIGS. 10A and 10B are schematic plan views illustrating the lower elastic member according to the embodiment, and FIG. 11 is a schematic perspective view illustrating a printed circuit board according to the embodiment.

The lens moving apparatus 100 according to the present embodiment is an apparatus that adjusts a distance between an image sensor and a lens within a camera module to allow the image sensor to be located at the focal distance of the lens. That is, the lens moving apparatus 100 functions to implement an auto-focus function.

As exemplarily illustrated in FIGS. 1A to 4B, the lens moving apparatus 100 according to the present embodiment includes a cover member 300, an upper elastic member 150, a bobbin 110, a coil 120 provided at the bobbin 110, a housing 140, driving magnets 130 and a printed circuit board 170 affixed to the housing 140, a lower elastic member 160, a base 210, and a displacement sensing unit that determines a displacement of the bobbin 110 in the optical axis direction, i.e. in a first direction.

The cover member 300 may generally take the form of a box and may be coupled to the top of the base 210. The cover member 300 defines a receiving space along with the base 210, such that the upper elastic member 150, the bobbin 110, the coil 120 provided at the bobbin 110, the housing 140, and the driving magnets 130 and the printed circuit board 170 affixed to the housing 140 are received in the receiving space.

The cover member 300 has an opening formed in an upper surface thereof to allow a lens coupled to the bobbin 110 to be exposed to outside light. In addition, the opening may be provided with a window formed of a light transmitting material. This may prevent impurities, such as, for example, dust or moisture, from entering the camera module.

The cover member 300 may have first recesses 310 formed in a lower end thereof. At this time, although will be described below, the base 210 may have second recesses 211 at positions thereof coming into contact with the first recesses 310 when the cover member 300 and the base 210 are coupled to each other (i.e. at positions corresponding to the first recesses 310). Upon coupling of the cover member 300 and the base 210, recesses each having a given area may be formed via merger of the first recesses 310 and the second recesses 211. A viscous adhesive member may be applied to the recesses. That is, the adhesive member applied to the recesses may be charged into a gap between facing surfaces of the cover member 300 and the base 210 through the recesses, thereby allowing the cover member 300 and the base 210 to be coupled to each other and sealing the gap between the cover member 300 and the base 210. In addition, the adhesive member may hermetically seal side surfaces of the cover member 300 and the base 210 as the cover member 300 and the base 210 are coupled to each other.

In addition, the cover member 300 may have a third recess 320 formed in a surface thereof corresponding to a terminal surface of the printed circuit board 170, so as not to interfere with a plurality of terminals formed at the terminal surface. The third recess 320 may be indented in the entire surface of the cover member 300 facing the terminal surface. As the adhesive member is applied inside the third recess 320, the cover member 300, the base 210 and the printed circuit board 170 may be sealed. In addition, the adhesive member may hermetically seal side surfaces of the cover member 300 and the base 210 as the cover member 300 and the base 210 are coupled to each other.

Although the first recesses 310, the second recesses 320, and the third recess 320 are formed respectively at the base 210 and the cover member 300, the embodiment is not limited thereto, and others of similar shapes may be formed only in the base 210 or may be formed only in the cover member 300.

The base 210 may generally have a square shape and be coupled to the cover member 300 to define a space for receiving the bobbin 110 and the housing 140.

The base 210 may have a protruding portion that protrudes outward by a prescribed thickness to surround a lower rim of the base 210. The prescribed thickness of the protruding portion may be equal to the thickness of the side surface of the cover member 300. When the cover member 300 is coupled to the base 210, the side surface of the cover member 300 may be seated on, come into contact with, be disposed on, or be coupled to an upper surface or a side surface of the protruding portion. As a result, the protruding portion may guide the cover member 300 coupled to the top thereof by coming into surface contact with an end of the cover member 300. The end of the cover member 300 may include a bottom surface or side surface of the cover member 300. At this time, the protruding portion of the base 210 and the end of the cover member 300 may be attached to and sealed with each other using, for example, an adhesive.

The protruding portion may be provided with the second recesses 211 at positions corresponding to the first recesses 310 of the cover member 300. As described above, the second recesses 211 may be merged with the first recesses 310 of the cover member 300 to define the recesses as described above and to define a space for charging of the adhesive member.

The base 210 has a central opening. The opening is formed at a position corresponding to a position of the image sensor arranged in the camera module.

In addition, the base 210 includes four guide members 216 upwardly protruding perpendicular thereto by a prescribed height from four corners thereof. The guide members 216 may have a polygonal column shape. The guide members 216 may be inserted into, or fastened or coupled to lower guide grooves 148 of the housing 140 that will be described below. As such, when the housing 140 is seated or disposed on the top of the base 210, the guide members 216 and the lower guide grooves 148 may guide a coupling position of the housing 140 onto the base 210 and, simultaneously, prevent the housing 140 from deviating from an installation target reference position due to, for example, vibration during operation of the lens moving apparatus 100 or due to worker mistakes during coupling.

As exemplarily illustrated in FIGS. 4A to 8B, the housing 140 may generally have a hollow column shape (for example, a hollow square column shape as illustrated in FIGS. 4A to 8B). The housing 140 is configured to support at least two driving magnets 130 and the printed circuit board 170. The bobbin 110 is received in the housing 140 so as to be movable in the first direction relative to the housing 140.

The housing 140 has four flat side surfaces 141. Each side surface 141 of the housing 140 may have an area equal to or greater than the area of a corresponding one of the driving magnets 130.

As exemplarily illustrated in FIG. 8B, among the four side surfaces 141 of the housing 140, two side surfaces facing each other are provided respectively with magnet penetration apertures 141a or recesses in which the driving magnets 130 are seated, placed, or fixed. The magnet penetration apertures 141a or recesses may have a size and shape corresponding to the driving magnets 130 and may have any other shapes to implement a guide function. A first driving magnet 131 and a second driving magnet 132, i.e. two driving magnets 130 may be mounted respectively to the magnet penetration apertures 141a.

In addition, among the four side surfaces 141 of the housing 140, one side surface perpendicular to the above-described two side surfaces or either surface except for the above-described two side surfaces may be provided with a sensor penetration aperture 141b in which a position sensor 180 as described below is inserted, placed, fixed, or seated. The sensor penetration aperture 141b may have a size and shape corresponding to the position sensor 180 as described below. In addition, the side surface provided with the sensor penetration aperture 141b is further provided with at least one mounting protrusion 149 to assist mounting, placement, provisional fixing, or complete fixing of the printed circuit board 170. The mounting protrusion 149 is configured to be inserted into a mounting aperture 173 formed in the printed circuit board 170 as described below. At this time, although the mounting aperture 173 and the mounting protrusion 149 may be coupled to each other in a shape-fit manner or an interference-fit manner, the mounting aperture 173 and the mounting protrusion 149 may simply implement a guide function.

Here, the other side surface opposite to the above-described side surface among the four side surfaces 141 of the housing 140 may be a flat solid surface, without being limited thereto.

In an additional embodiment of the housing 140, among the four side surfaces 141 of the housing 140, both side surfaces facing each other are provided with first and second magnet penetration apertures 141a and 141a' in which the driving magnets 130 are seated, placed, or fixed. In addition, among the four side surfaces 141 of the housing 140, one side surface perpendicular to the above-described two side surfaces or either surface except for the above-described two side surfaces may be provided with a third magnet penetration aperture and a sensor penetration aperture 141b spaced apart from the third magnet penetration aperture by a prescribed distance. Moreover, among the four side surfaces 141 of the housing 140, the other side surface facing the above-described side surface provided with the third magnet penetration aperture may be provided with a fourth magnet penetration aperture.

That is, the four side surfaces 141 of the housing 140 are provided with the four magnet penetration apertures and the single sensor penetration aperture 141b.

At this time, the first magnet penetration aperture 141a and the second magnet penetration aperture 141a' have the same size and the same shape and also have (almost) the same lateral length as the lateral length of the side surfaces of the housing 140. On the other hand, the third magnet penetration aperture and the fourth magnet penetration aperture may have the same size and the same shape and may also have a smaller lateral length than the first magnet penetration aperture 141a and the second magnet penetration aperture 141a'. This serves to attain a space for the sensor penetration aperture 141b because the side surface provided with the third magnet penetration aperture must be provided with the sensor penetration aperture 141b.

It will be naturally appreciated that the first driving magnet 131 to the fourth driving magnet are respectively seated, placed, or fixed in the first magnet penetration aperture to the fourth magnet penetration aperture. At this time, likewise, the first driving magnet 131 and the second driving magnet 132 have the same size and the same shape and also have almost the same lateral length as the lateral length of the side surfaces of the housing 140. In addition, the third driving magnet and the fourth driving magnet may have the same size and the same shape and may also have a smaller lateral length than the first driving magnet 131 and the second driving magnet 132.

Here, the third magnet penetration aperture and the fourth magnet penetration aperture may be symmetrically arranged on a line on the basis of the center of the housing 140. That is, the third driving magnet 130 and the fourth driving magnet 130 may be symmetrically arranged on a line on the basis of the center of the housing 140. In the case where the third driving magnet 130 and the fourth driving magnet 130 are deviated to one side regardless of the center of the housing 140 although they are opposite to each other, electromagnetic force deviated to one side may be applied to the coil 120 of the bobbin 110 and, therefore, tilting of the bobbin 110 may occur. In other words, as the third driving magnet 130 and the fourth driving magnet 130 are symmetrically arranged on a line on the basis of the center of the housing 140, electromagnetic force may be applied to the bobbin 110 and the coil 120 without deviation, which ensures easy and accurate guidance of the bobbin 110 in the first direction.

In addition, as exemplarily illustrated in FIGS. 3A to 6B and FIGS. 8A and 8B, a plurality of first stoppers 143 may protrude from an upper surface of the housing 140. The first stoppers 143 serve to prevent collision between the cover member 300 and a body of the housing 140 and may prevent the upper surface of the housing 140 from directly colliding with an inner ceiling surface of the cover member 300 upon generation of an external shock. In addition, the first stoppers 143 may serve to guide an installation position of the upper elastic member 150. To this end, as exemplarily illustrated in FIG. 9, the upper elastic member 150 may be provided at positions corresponding to the first stoppers 143 with guide grooves 155 having a shape corresponding to the shape of the first stoppers 143.

In addition, a plurality of upper frame support bosses 144 may protrude from the top of the housing 140 so as to be coupled to an outer frame 152 of the upper elastic member 150. As will be described below, the outer frame 152 of the upper elastic member 150 corresponding to the upper frame support bosses 144 may be formed with first through-holes 152a or recesses having a shape corresponding to the shape of the upper frame support bosses 144. The upper frame support bosses 144 may be fixed to the first through-holes 152a or recesses using an adhesive or via fusion. The fusion may be, for example, thermal fusion or ultrasonic fusion.

In addition, as exemplarily illustrated in FIG. 7A or 7B, a plurality of lower frame support bosses 147 may protrude from the lower portion of the housing 140 so as to be coupled to outer frame 162 of the lower elastic member 160. The outer frame 162 of the lower elastic member 160 corresponding to the lower frame support bosses 147 may be formed with insertion recesses 162a or holes having a shape corresponding to the shape of the lower frame support bosses 147. The lower frame support bosses 147 may be fixed to the insertion recesses 162a or holes using an adhesive or via fusion. The fusion may be, for example, thermal fusion or ultrasonic fusion.

Although the driving magnet 130 may be fixed to the magnet penetration aperture 141a using an adhesive, the embodiment is not limited thereto and an adhesive member such as, for example, a double-sided tape may be used. In an alternative embodiment, instead of the magnet penetration aperture 141a, a recessed magnet seat may be formed in the inner surface of the housing 140. The magnet seat may have a size and shape corresponding to the size and shape of the driving magnet 130.

The driving magnets 130 may be installed at positions corresponding to the coil 120 provided at the bobbin 110. In addition, the driving magnets 130 may be configured respectively into a unitary body. In the present embodiment, each driving magnet 130 may be oriented in such a way that one surface thereof facing the coil 120 provided at the bobbin 110 defines an N-pole and an opposite outer surface thereof defines an S-pole. However, the embodiment is not limited thereto and the driving magnet 130 may be oriented in the other way. In addition, the driving magnet 130 may be bisected into planes perpendicular to an optical axis.

The driving magnet 130 may be configured into a cuboid having a constant width and may be seated in the magnet penetration aperture 141a or recess such that a wide surface of the driving magnet 130 constitutes a portion of the side surface of the housing 140. At this time, the driving magnets 130 facing each other may be installed in parallel with each other. In addition, the driving magnets 130 may be arranged to face the coil 120 of the bobbin 110. At this time, facing surfaces of the driving magnet 130 and the coil 120 of the bobbin 110 may be placed in parallel planes. However, the embodiment is not limited thereto. According to design, only one of the driving magnet 130 and the coil 120 of the bobbin 110 may be formed into a plane and the other one may be formed into a curved plane. Alternatively, both facing surfaces of the coil 120 of the bobbin 110 and the driving magnet 130 may be curved surfaces. At this time, the facing surfaces of the coil 120 of the bobbin 110 and the driving magnet 130 may have the same curvature.

As described above, the sensor penetration aperture 141b or recess is formed in one side surface of the housing 140, the position sensor 180 is inserted, placed, or seated in the sensor penetration aperture 141b, and the position sensor 180 is electrically coupled to one surface of the printed circuit board 170 via soldering or brazing. In other words, the printed circuit board 170 may be fixed to, supported by, or disposed at the exterior of the side surface provided with the sensor penetration aperture 141b or recess among the four side surfaces 141 of the housing 140, and the position sensor 180 may be provided, disposed, or mounted at a position corresponding to a sensing magnet 190 at an inner surface of the printed circuit board.

The position sensor 180 may constitute the displacement sensing unit to determine a first displacement value in the first direction of the bobbin 110, along with the sensing magnet 190 of the bobbin 110 as described below. To this end, the position sensor 180 and the sensor penetration aperture 141b or recess are located at a position corresponding to the position of the sensing magnet 190.

The position sensor 180 may be a sensor that senses variation in magnetic force emitted from the sensing magnet 190 of the bobbin 110. In addition, the position sensor 180 may be a hall sensor. However, this is given by way of example and the present embodiment is not limited to the hall sensor. Any other sensors capable of sensing variation in magnetic force may be used and any other sensors capable of sensing positions other than magnetic force may be used. For example, a photo reflector may be used.

As exemplarily illustrated in FIGS. 8A and 8B and FIG. 11, the printed circuit board 170 may be coupled to or disposed at one side surface of the housing 140 and may have the mounting aperture 173 or recess as described above. In this way, the installation position of the printed circuit board 170 may be guided by the mounting protrusion 149 formed at one side surface of the housing 140.

In addition, a plurality of second terminals 171 may be arranged at the printed circuit board 170 so as to be electrically connected to an external power source. The terminals 171 may receive external power and supply current to the position sensor 180. The number of the second terminals 171 formed at the printed circuit board 170 may be reduced or increased according to the kinds of constituent elements that need to be controlled. According to the present embodiment, the printed circuit board 170 may be a flexible printed circuit board (FPCB). The second terminal 171 may be connected to the external power source and, to this end, may be soldered or brazed to the external power source.

In addition, the printed circuit board 170 may be provided or disposed, or fixed or coupled to the side surface of the housing 140. That is, the printed circuit board 170 may be disposed, fixed, or provided such that an inner surface (i.e. a surface on which the position sensor is mounted or disposed) of the printed circuit board 170 comes into contact with or faces the exterior side surface of the housing 140.

The printed circuit board 170 further has two avoidance cut-outs 178a and 178b formed in both sides of a lower portion thereof. The two avoidance cutouts 178a and 178b may extend downward from respective positions corresponding to the first terminals 165a and 165b that are provided at the lower elastic member 160 as described below. In the present embodiment, as described below, the first terminals 165 are distantly spaced apart from each other at one surface of the outer frame. As such, there may be provided the two avoidance cutouts to provide two removal spaces of the respective first terminals.

Here, the first terminals 165a and 165b of the lower elastic member 160 as described below will respectively occupy spaces of the two avoidance cutouts 178a and 178b. In this way, the first terminals 165a and 165b and the second terminals 171 may be arranged at the same side surface of the housing 140 to face downward.

That is, owing to the two avoidance cutouts 178, even when the second terminals 171 of the printed circuit board 170 and the first terminals 165a and 165b of the lower elastic member 160 are arranged at the same side surface of the housing 140, there occurs no spatial interference therebetween.

Accordingly, the first terminals 165a and 165b of the lower elastic member 160 and the second terminals 171 of the printed circuit board 170 may be aligned in a row at the lower end of one side surface of the housing 140 or at one surface of the base 210.

At this time, all of the first 165a and 165b and the second terminals 171 may be disposed or provided to face outward.

By providing the second terminals 171 of the printed circuit board 170 and the first terminals 165a and 165b of the lower elastic member 160 at the same side surface of the housing 140 as described above, the second terminals 171 and the first terminals 165 may be aligned at one surface of the lens moving apparatus 100, which allows processes of electrically connecting all of the second terminals 171 and the first terminals 165 to the external power source to be performed in sequence without requiring rotation of the lens moving apparatus 100. As a result, the present embodiment may assist a worker in easily performing a connection process of connecting the printed circuit board and the lower elastic member to the external power source and may considerably reduce a time required for the connection process. In addition, since both ends of the coil 120 of the bobbin 110 should be connected to the lower elastic member rather than being connected to the printed circuit board that provides only a considerably narrow connection working space, easy and rapid implementation of a connection process between the coil and the external power source is impossible.

In addition, the printed circuit board 170 may receive external power through the terminals 171 and supply current to the position sensor 180 and the coil 120 of the bobbin 110. The number of the terminals 171 formed at the printed circuit board 170 may be reduced or increased according to the kinds of constituent elements that need to be controlled.

The terminals 171 provided at the printed circuit board 170 may be aligned in a row at the lower portion of the printed circuit board 170 in a state in which the printed circuit board 170 is mounted to one side surface of the housing 140.

The terminals 171 may include an input terminal 174 electrically connected to the external power source that is provided at an electronic appliance to which the lens moving apparatus is mounted to receive current input from the external power source, an output terminal 178 electrically connected to the external power source to return the current from the external power source after the current passes through the coil of the bobbin, an upper connection terminal 176 electrically connected to the upper elastic member and a lower connection terminal 177 electrically connected to the lower elastic member.

At this time, the input terminal 174 and the output terminal 178 are oriented outward at the lower portion of the printed circuit board 170. This serves to provide a terminal connection working space at the outside of the lens moving apparatus when the lens moving apparatus is mounted to the electronic appliance.

For example, as exemplarily illustrated in FIGS. 8B and 11, the input terminal 174 may be electrically connected to the lower connection terminal 177 via one printed circuit 174a among a plurality of printed circuits provided at the printed circuit board 170 and the output terminal 178 may be electrically connected to the upper connection terminal 176 via the other printed circuit 178a among the printed circuits provided at the printed circuit board 170.

Of course, conversely, the input terminal 174 may be electrically connected to the upper connection terminal 176 via the other printed circuit 178a among the printed circuits provided at the printed circuit board 170 and the output terminal 178 may be electrically connected to the lower connection terminal 177 via one printed circuit 174a among the printed circuits provided at the printed circuit board 170.

Here, the upper connection terminal 176 and the lower connection terminal 177 may be arranged at an inner surface of the printed circuit board 170. This serves to achieve electrical connection between the upper and lower elastic members and the upper and lower connection terminals 176 and 177.

The printed circuit board 170 may include a controller that readjusts the amount of current to be applied to the coil 120 based on the first displacement value sensed by the displacement sensing unit. That is, the controller is mounted on the printed circuit board 170. In another embodiment, the controller may be mounted on a separate substrate rather than being mounted on the printed circuit board 170. The separate substrate may be a substrate on which the image sensor of the camera module is mounted, or any one of other substrates.

An actuator driving distance may be additionally calibrated based on a hall voltage difference with respect to magnetic flux detected by the hall sensor, i.e. variation in magnetic flux density.

The bobbin 110 may be configured to reciprocate in a first axial direction relative to the housing 140 that is fixed in the first axial direction. Auto-focusing may be implemented via movement of the bobbin 110 in the first axial direction.

The bobbin 110 will be described below in more detail with reference to the annexed drawings.

Meanwhile, the upper elastic member 150 and the lower elastic member 160 may elastically support upward movement and/or downward movement of the bobbin 110 in the optical axis direction of the bobbin 110. The upper elastic member 150 and the lower elastic member 160 may be leaf springs.

As exemplarily illustrated in FIGS. 2A to 4B and FIGS. 9 and 10, the upper elastic member 150 and the lower elastic member 160 may respectively include inner frames 151 and 161 coupled to the bobbin 110, outer frames 152 and 162 coupled to the housing 140, and connectors 153 and 163 connecting the inner frames 151 and 161 and the outer frames 152 and 162 to each other.

The connectors 153 and 163 may be bent at least one time to define a given pattern shape. Through position variation and fine deformation of the connectors 153 and 163, upward movement and/or downward movement of the bobbin 110 in the optical axis direction, i.e. in the first direction may be flexibly (or elastically) supported.

According to the present embodiment, as exemplarily illustrated in FIG. 9, the upper elastic member 150 electrically connects the top of the housing 140 and the top of the bobbin 110 to each other. The upper elastic member 150 has the first through-holes 152a formed in the outer frame 152 and a plurality of second through-holes 151a formed in the inner frame 151.

The first through-holes 152a may be engaged with the upper frame support bosses 144 formed at the upper surface of the housing 140, and the second through-holes 151a or recesses may be engaged with upper support bosses formed at an upper surface of the bobbin 110 as described below. That is, the outer frame 152 may be fixed and coupled to the housing 140 using the first through-holes 152a and the inner frame 151 may be fixed and coupled to the bobbin 110 using the second through-holes 151a or recesses.

The connector 153 connects the inner frame 151 and the outer frame 152 to each other such that the inner frame 151 is elastically deformable in the first direction relative to the outer frame 152 within a prescribed range.

At least one of the inner frame 151 and the outer frame 152 of the upper elastic member 150 may be provided with at least one terminal that is electrically connected to at least one of the coil 120 of the bobbin 110 and the printed circuit board 170.

As exemplarily illustrated in FIGS. 2A and 10, the lower elastic member 160 electrically connects the lower portion of the housing 140 and the lower portion of the bobbin 110 to each other. Specifically, the lower elastic member 160 connects the lower portion of the housing 140 and the lower portion of the bobbin 110 to each other to allow the bobbin 110 to elastically reciprocate relative to the housing 140 in the optical axis direction.

To this end, the lower elastic member 160 may have the insertion recesses 162a or holes formed in the outer frame 162 and a plurality of third through-holes 161a or recesses formed in the inner frame 161.

The insertion recesses 162a or holes are engaged with the lower frame support bosses 147 formed at a lower surface of the housing 140, and the third through-holes 161a or recesses are engaged with lower support bosses 114 formed at a lower surface of the bobbin 110 as described below. That is, the outer frame 162 is fixed and coupled to the housing 140 using the insertion recesses 162a or holes and the inner frame 161 is fixed and coupled to the bobbin 110 using the third through-holes 161a or recesses.

The connector 163 connects the inner frame 161 and the outer frame 162 to each other such that the inner frame 161 is elastically deformable in the first direction relative to the outer frame 162 within a prescribed range.

The lower elastic member 160 may be formed of an electrically conductive material. In addition, the lower elastic member 160 electrically connects the coil 120 (i.e. both ends of the coil) to the external power source. In this case, the coil 120 may be configured in such a manner that one of both ends of the coil 120 is located at the lower portion of the bobbin 110 and the other end of the coil 120 is located at the lower portion of the bobbin 110 in a state in which the coil 120 is wound around the bobbin 110 by an even number of turns.

In the case where the coil 120 has a block shape rather than being wound as described above, both ends of the coil 120 may be located at the lower portion of the bobbin 110.

When both ends of the coil 120 are located at the lower portion of the bobbin 110 as described above, the ends of the coil 120 may be electrically connected to, or be subjected to soldering or brazing to the lower electric member 120.

The lower elastic member 160, as exemplarily illustrated in FIGS. 2A and 10, may include a first lower elastic member 160a and a second lower elastic member 160b that are electrically disconnected or spatially separated left and right members. Through this bisection configuration, the first lower elastic member 160a and the second lower elastic member 160b of the lower elastic member 160 may receive different polarities of power or different magnitudes of powers. That is, after the inner frame 161 and the outer frame 162 are coupled respectively to the bobbin 110 and the housing 140, solder balls are provided at positions of the inner frame 161 corresponding to both ends of the coil 120 wound around the bobbin 110 such that the inner frame 161 and the outer frame 162 may receive different polarities of power or different magnitudes of powers via current carrying connection, such as, for example, soldering, at the solder balls. In addition, the first lower elastic member 160a may be electrically connected to one of both ends of the coil 120 and the second lower elastic member 160b may be electrically connected to the other end of the coil 120 so as to receive current and/or a voltage from the external power source.

Here, the first lower elastic member 160a and the second lower elastic member 160b, which are electrically separated from each other, respectively include the first 165a and 165b that are electrically connected to the external power source to supply external power to the ends of the coil.

The first terminals 165a and 165b of the lower elastic members 160a and 160b and the second terminals 171 of the printed circuit board 170 may be arranged at the same side surface of the housing 140 to face downward.

As exemplarily illustrated in FIGS. 2A and 10, the first terminals 165 may extend outward from one surface of the outer frame 162 and be bent downward. At this time, each of the first terminals 165a and 165b may have a rectangular plate shape.

In addition, according to the present exemplary embodiment, the first terminals 165a and 165b may be located at adjacent positions of one surface of the outer frame 162. Thereby, as described above, to prevent spatial interference between the first terminals 165a and 165b and the printed circuit board 170, the printed circuit board 170 may have a single avoidance cutout 178. Of course, in the lower elastic member 160 according to the present exemplary embodiment, to prevent spatial interference of the two respective first terminals 165a and 165b, the printed circuit board 170 may have two avoidance cutouts 178 at positions corresponding to the two respective first terminals 165a and 165b.

The first terminals 165a and 165b may respectively have cutouts 166a and 167a formed in at least one of both side surfaces of a bending portion. Through provision of the cutouts, after the lower elastic member 160 is fixed to, disposed at, or coupled to the lower portions of the bobbin 110 and the housing 140, the first terminals 165a and 165b may be easily bent relative to the outer frames 162, which may facilitate an assembly process of the lens moving apparatus.

Of course, conversely, the lower elastic member may be fixed to, disposed at, or coupled to the lower portions of the bobbin and the housing after the first terminals are first bent.

Then, one of both ends of the coil may be electrically connected, brazed, or soldered to a portion of the inner frame 161 of the first lower elastic member 160a and the other end of the coil may be electrically connected, brazed, or soldered to a portion of the inner frame 161 of the second lower elastic member 160b.

Consequently, considering current flow between the coil 120, the lower elastic member 160 and the external power source according to the present exemplary embodiment, after current from the external power source is supplied to the outer frame 162 of the first lower elastic member 160a through the first terminal 165a of the first lower elastic member 160a electrically connected to the external power source, the current may be supplied to one of both ends of the coil 120 through the connector 163 and the inner frame 161 of the first lower elastic member 160a. Then, the current having passed through the entire coil 120 from the end of the coil 120 may be supplied to the inner frame 161 of the second lower elastic member 160b through the other end of the coil 120. Thereafter, the current passes from the inner frame 161 of the second lower elastic member 160b to the outer frame 162 of the second lower elastic member 160b through the connector 163 of the second lower elastic member 160b, thereby being finally directed to the external power source through the first terminal 165b of the second lower elastic member 160b. In addition, although the first terminals 165a and 165b are integrally bent from the second lower elastic member in the embodiment, the first terminals 165a and 165b may be arranged at the base, separately from the second lower elastic member, and be electrically connected to the second lower elastic member. In this case, these separate first terminals 165a and 165b may be terminal pins that are integrally formed with the base, or coupled to the base.

Meanwhile, the upper elastic member 150, the lower elastic member 160, the bobbin 110, and the housing 140 may be assembled with one another via, for example, bonding using thermal fusion and/or an adhesive. At this time, according to an assembly sequence, thermal fusion fixing and adhesive bonding may be sequentially implemented to finish a fixing operation.

In an alternative embodiment, the upper elastic member 150 may have a bisection configuration and the lower elastic member 160 may have a unitary configuration.

At least one of the inner frame 161 and the outer frame 162 of the lower elastic member 160 may be provided with at least one terminal that is electrically connected to at least one of the coil 120 of the bobbin 110 and the printed circuit board 170.

For example, the upper elastic member 150 has a first intermediate terminal 156 that is formed at the outer frame 152 and electrically connected to the upper connection terminal 176 of the printed circuit board 170. Among both ends of the coil 120, the other end 120b may be electrically connected to the inner frame 151 of the upper elastic member 150 via soldering or other current conduction means such as solder balls. This will be described below in more detail with reference to the annexed drawings.

As exemplarily illustrated in FIGS. 10A and 10B, the lower elastic member 160 electrically connects the lower portion of the housing 140 and the lower portion of the bobbin 110 to each other. In addition, the lower elastic member 160 may have the insertion recesses 162a or holes formed in the outer frame 162 and the third through-holes 161a or recesses formed in the inner frame 161.

The insertion recesses 162a or holes are engaged with the lower frame support bosses 147 formed at the lower surface of the housing 140, and the third through-holes 161a or recesses are engaged with the lower support bosses 114 formed at the lower surface of the bobbin 110 as described below. That is, the outer frame 162 may be fixed and coupled to the housing 140 using the insertion recesses 162a or holes and the inner frame 161 may be fixed and coupled to the bobbin 110 using the third through-holes 161a or recesses.

The connector 163 connects the inner frame 161 and the outer frame 162 to each other such that the inner frame 161 is elastically deformable in the first direction relative to the outer frame 162 within a prescribed range.

The lower elastic member 160, as exemplarily illustrated in FIGS. 10A and 10B, may be configured equally or substantially equally to the upper elastic member 150. After the inner frame 161 and the outer frame 162 are coupled respectively to the bobbin 110 and the housing 140, solder balls may be provided at positions of the inner frame 161 corresponding to both ends of the coil 120 wound around the bobbin 110 such that the inner frame 161 and the outer frame 162 may receive power or current via current carrying connection, such as, for example, soldering, at the solder balls.

Meanwhile, the upper elastic member 150, the lower elastic member 160, the bobbin 110, and the housing 140 may be assembled with one another via, for example, bonding using thermal fusion and/or an adhesive. At this time, according to an assembly sequence, thermal fusion fixing and adhesive bonding may be sequentially implemented to finish a fixing operation.

At least one of the inner frame 161 and the outer frame 162 of the lower elastic member 160 may be provided with at least one terminal electrically connected to at least one of the coil 120 of the bobbin 110 and the printed circuit board 170. For example, the lower elastic member 160 has a second intermediate terminal 166 that is formed at the outer frame 162 and electrically connected to the lower connection terminal 177 of the printed circuit board 170. One end 120a of the coil 120 may be electrically connected to the inner frame 161 of the lower elastic member 160 through current carrying connection such as soldering or brazing. This will be described below in more detail with reference to the annexed drawings.

Figure 12:
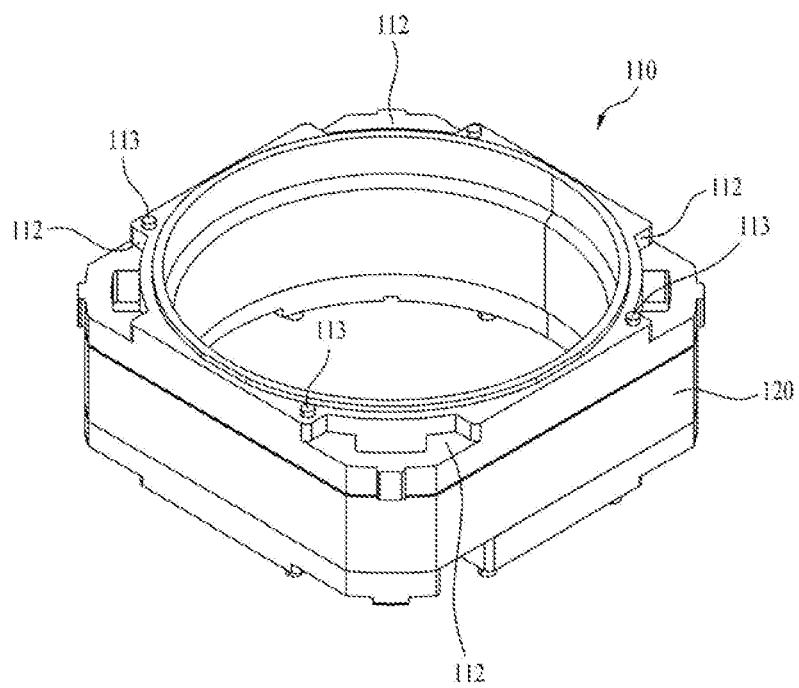
FIG. 12 is a schematic perspective view illustrating a bobbin according to one embodiment.
Figure 13:
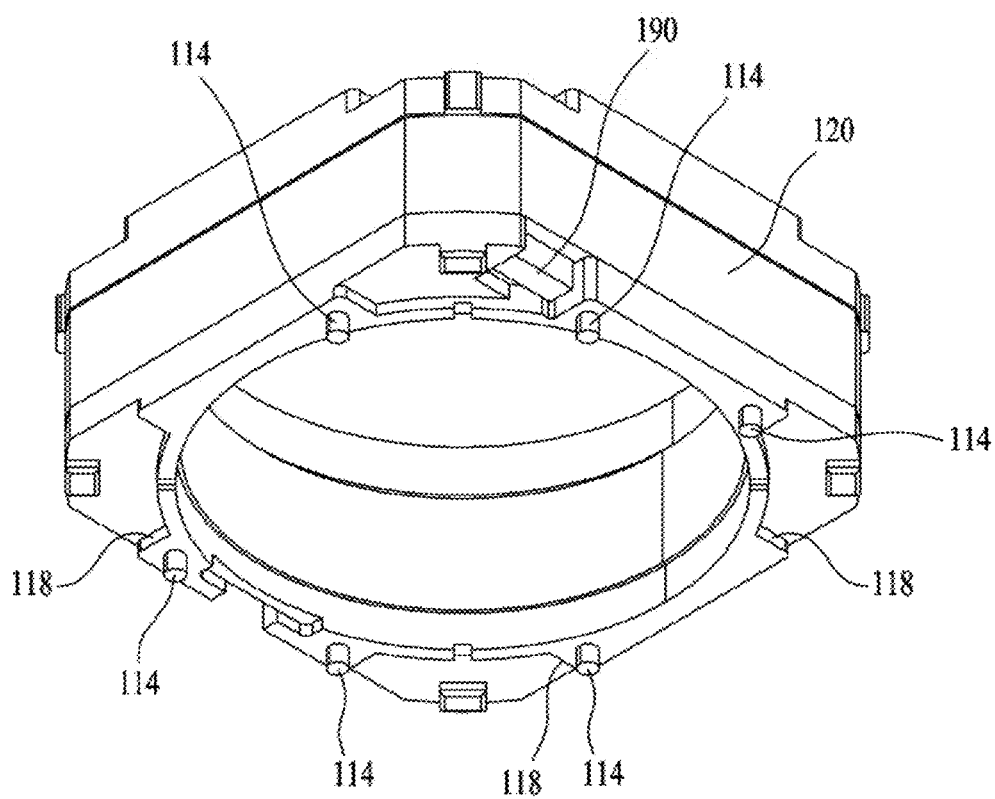
FIG. 13 is a schematic bottom perspective view illustrating the bobbin according to one embodiment.
Figure 14:
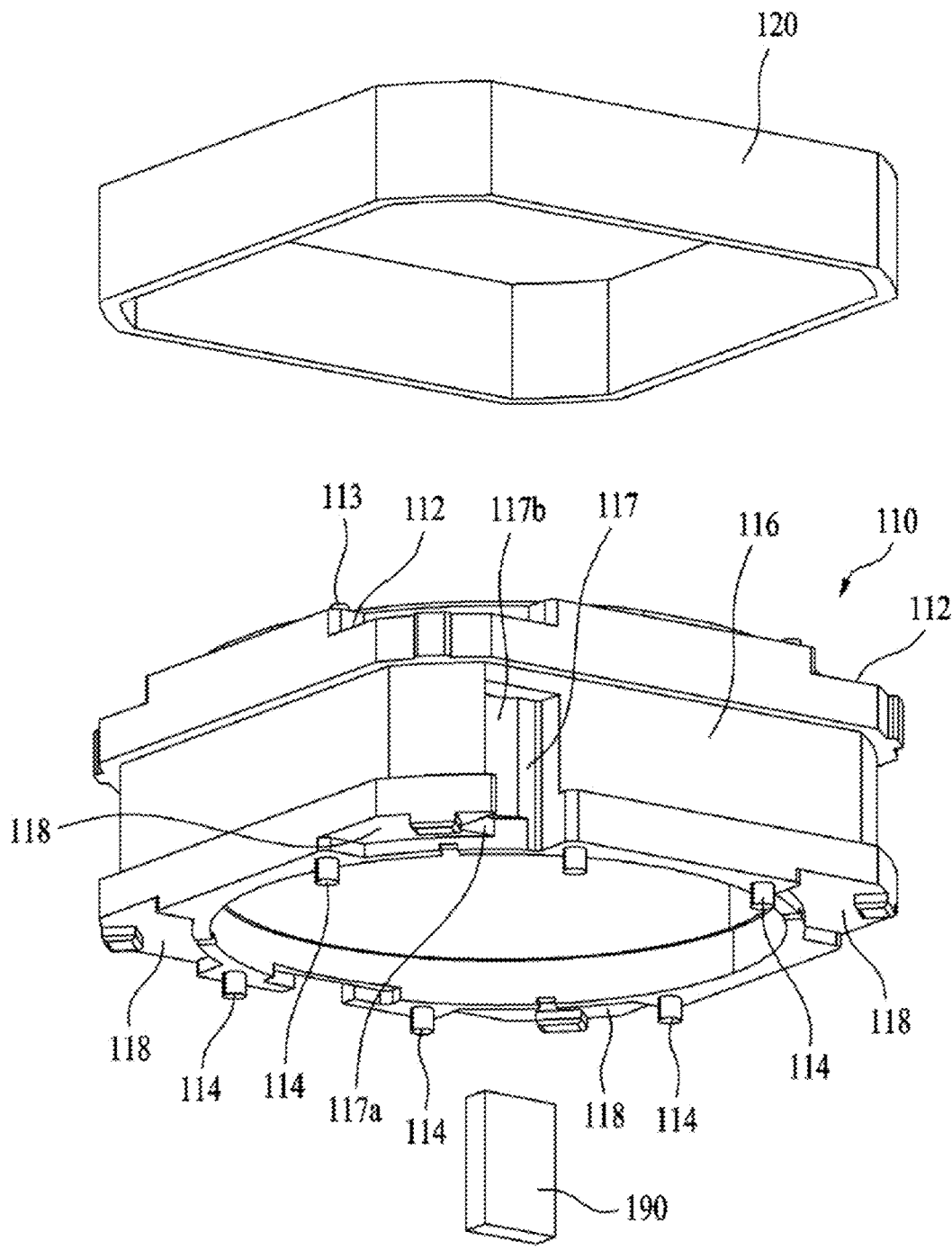
FIG. 14 is a schematic exploded perspective view illustrating the bobbin according to one embodiment.
Figure 15:
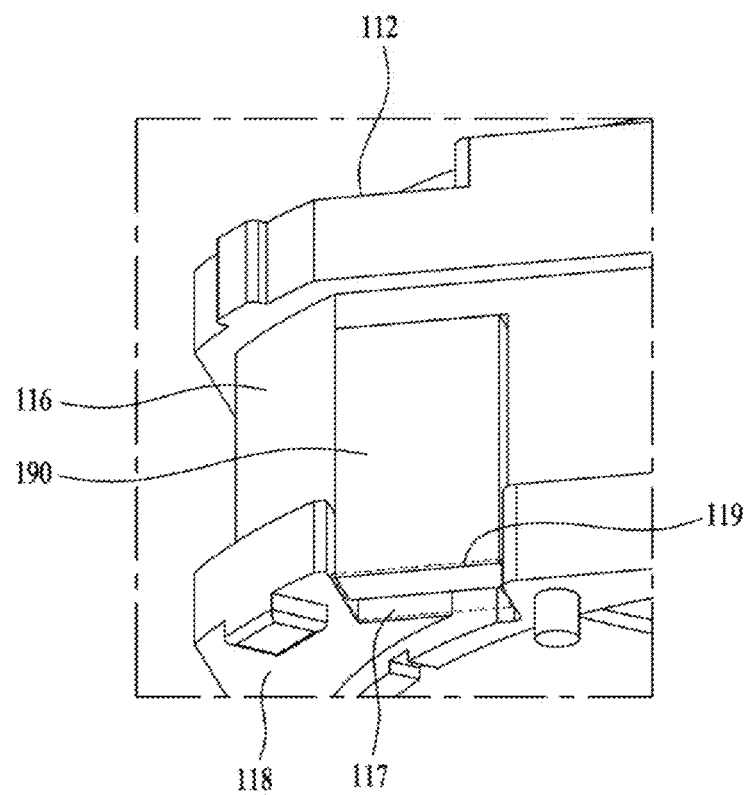
FIG. 15 is a partially enlarged perspective view of FIG. 14.
Figure 16:
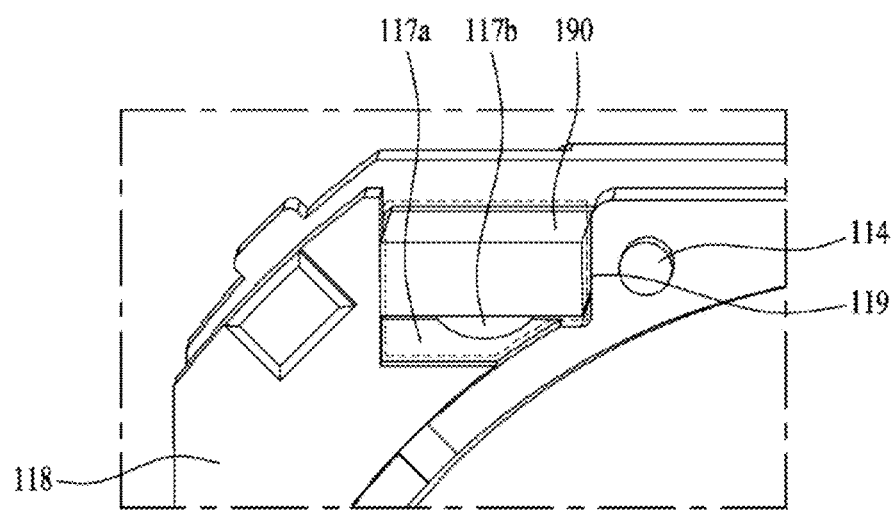
FIG. 16 is a partially enlarged bottom view of FIG. 14.
Figure 17:
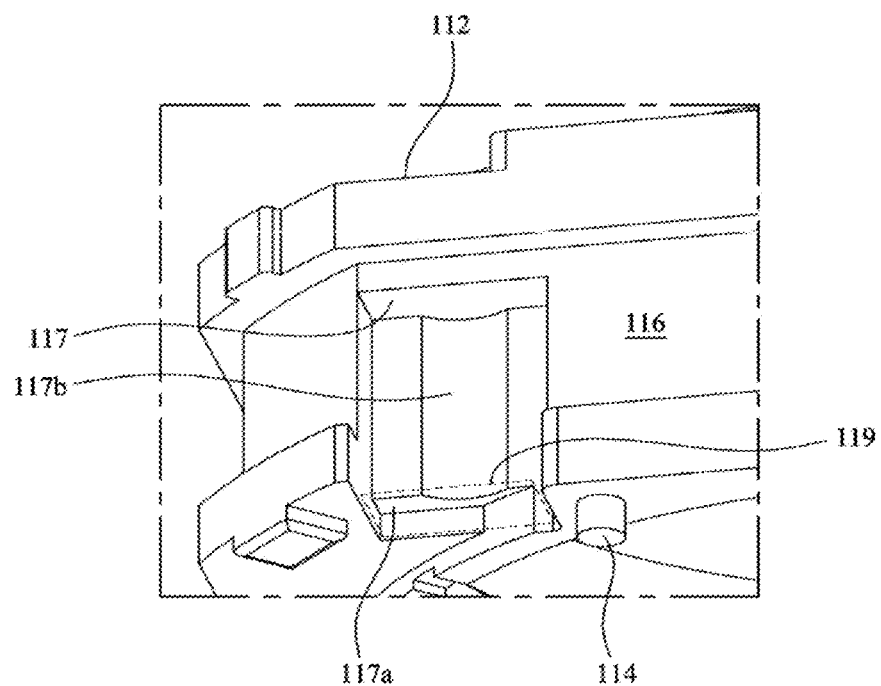
FIG. 17 is a schematic partially enlarged perspective view illustrating a receiving recess according to one embodiment.
Figure 18:
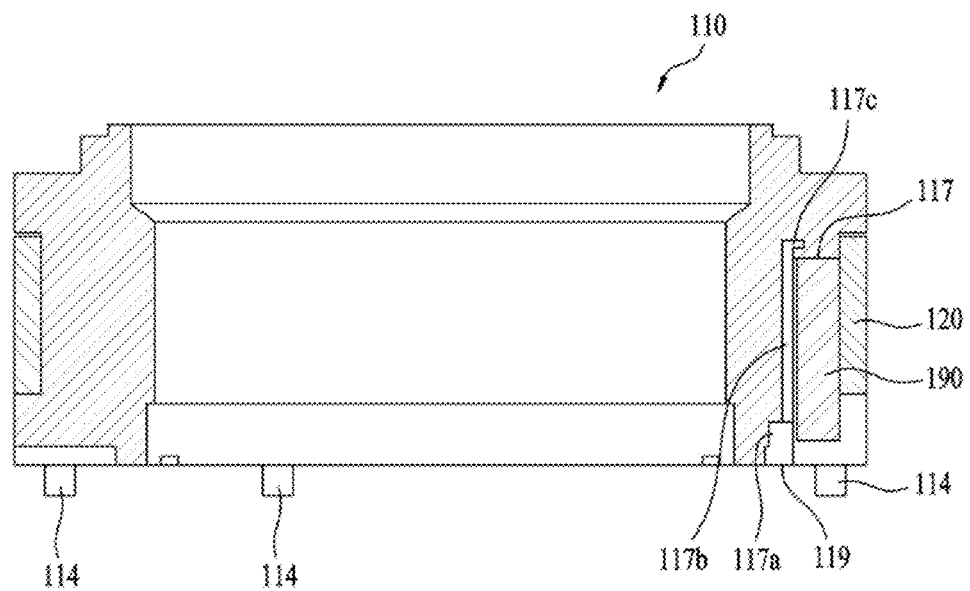
FIG. 18 is a schematic longitudinal sectional view illustrating the bobbin according to one embodiment.

FIG. 12 is a schematic perspective view illustrating the bobbin according to one embodiment, FIG. 13 is a schematic bottom perspective view illustrating the bobbin according to one embodiment, FIG. 14 is a schematic exploded perspective view illustrating the bobbin according to one embodiment, FIG. 15 is a partially enlarged perspective view of FIG. 14, FIG. 16 is a partially enlarged bottom view of FIG. 14, FIG. 17 is a schematic partially enlarged perspective view illustrating a receiving recess according to one embodiment, and FIG. 18 is a schematic longitudinal sectional view illustrating the bobbin according to one embodiment.

As exemplarily illustrated in FIGS. 12 to 18, the bobbin 110 may be installed in an inner space of the housing 140 so as to reciprocate in the optical axis direction. The coil 120 as described below may be affixed to an outer circumferential surface of the bobbin 110 so as to electromagnetically interact with the driving magnets 130 of the housing 140. Thereby, the bobbin 110 may reciprocate in the first direction via electromagnetic interaction of the coil 120 and the driving magnets 130. In addition, the bobbin 110 may be flexibly (or elastically) supported by the upper elastic member 150 and the lower elastic member 160 and moved in the first direction as the optical axis direction so as to perform auto-focusing.

Although not illustrated, the bobbin 110 may include a lens barrel (not illustrated) in which at least one lens is received. However, the lens barrel is merely a constituent element of a camera module as described below and may not be an essential constituent element of the lens moving apparatus. The lens barrel may be coupled inside the bobbin 110 in various manners. For example, female screw-threads may be formed at an inner circumferential surface of the bobbin 110 and male screw-threads corresponding to the female screw-threads may be formed at an outer circumferential surface of the lens barrel such that the lens barrel may be fastened to the bobbin 110 via screwing. However, the embodiment is not limited thereto and, instead of forming the screw-threads at the inner circumferential surface of the bobbin 110, the lens barrel may be directly fixed inside the bobbin 110 via various other methods except for screwing. Alternatively, one sheet of lens may be integrally formed with the bobbin 110 without the lens barrel. The lens coupled to the lens barrel may be one sheet of lens, or two or more lenses may compose an optical system.

In addition, a plurality of upper support bosses 113 and a plurality of lower support bosses 114 may protrude from the upper surface and the lower surface of the bobbin 110.

The upper support bosses 113, as exemplarily illustrated in FIG. 12, may have a cylindrical shape or a prism shape and serve to couple and fix the inner frame 151 of the upper elastic member 150 to the bobbin 110. According to the present embodiment, the inner frame 151 of the upper elastic member 150 may be formed with the second through-holes 151a or recesses at positions corresponding to the upper support bosses 113. At this time, the upper support bosses 113 and the second through-holes 151a or recesses may be fixed to each other via thermal fusion, or may be fixed to each other using an adhesive member such as, for example, epoxy. In addition, there may be provided a plurality of upper support bosses. At this time, the upper support bosses may be spaced apart from one another by an appropriate distance to prevent interference with nearby constituent elements. That is, the upper support bosses may be symmetrically arranged about the center of the bobbin 110 so as to be spaced apart from one another by a constant distance. Alternatively, the upper support bosses may be symmetrically arranged about a specific virtual line passing through the center of the bobbin 110, but may not be spaced apart from one another by a constant distance.

The lower support bosses 114, as exemplarily illustrated in FIG. 13, may have a cylindrical shape or a prism shape and serve to couple and fix the inner frame 161 of the lower elastic member 160 to the bobbin 110. According to the present embodiment, the inner frame 161 of the lower elastic member 160 may be formed with the third through-holes 161a or recesses at positions corresponding to the lower support bosses 114. At this time, the lower support bosses 114 and the third through-holes 161a or recesses may be fixed to each other via thermal fusion, or may be fixed to each other using an adhesive member such as, for example, epoxy. In addition, there may be provided a plurality of lower support bosses 114 as illustrated in FIG. 13. At this time, the lower support bosses 114 may be spaced apart from one another by an appropriate distance to prevent interference with nearby constituent elements. That is, the lower support bosses 114 may be symmetrically arranged about the center of the bobbin 110 so as to be spaced apart from one another by a constant distance.

In addition, the bobbin 110 is formed at the upper surface and the lower surface thereof with upper escape recesses 112 and lower escape recesses 118 at positions corresponding to the connectors 153 of the upper elastic member 150 and the connectors 163 of the lower elastic member 160.

Through provision of the upper escape recesses 112 and the lower escape recesses 118, when the bobbin 110 is moved in the first direction relative to the housing 140, there is no spatial interference between the connectors 153 and 163 and the bobbin 110, which may facilitate easier elastic deformation of the connectors 153 and 163. In addition, although the upper escape recesses may be located at corners of the housing 140 as in the embodiment, the upper escape recesses may be located at the side surfaces of the housing according to the shape and/or position of the connectors of the elastic member.

In addition, although the outer circumferential surface of the bobbin 110 may be provided with a coil seating recess 116 for installation of the coil 120, only a seating portion may be provided.

Although the coil 120 may take the form of a ring-shaped coil block inserted into and coupled to the outer circumferential surface, the coil seating recess 116, or the seating portion of the bobbin 110, the embodiment is not limited thereto and the coil 120 may be directly wound around the outer circumferential surface, the coil seating recess 116, or the seating portion of the bobbin 110.

According to the present embodiment, the coil 120 may have an approximately octagonal shape as exemplarily illustrated in FIG. 14. This shape corresponds to the shape of the outer circumferential surface of the bobbin 110 and the bobbin 110 may also have an octagonal shape. In addition, at least four sides of the coil 120 may be linear sides and corners connecting the linear sides may be rounded or linearly formed. At this time, the linear sides of the coil 120 may correspond to the driving magnets 130. In addition, surfaces of the driving magnets 130 corresponding to the coil 120 may have the same curvature as the coil 120. That is, when the coil 120 has a linear shape, the corresponding surfaces of the driving magnets 130 may be flat formed. When the coil 120 has a curved shape, the corresponding surfaces of the driving magnets 130 may be curved and have the same curvature. In addition, even if the coil 120 is curved, the corresponding surfaces of the driving magnets 130 may be flat surfaces, and vice versa.

Figure 19:
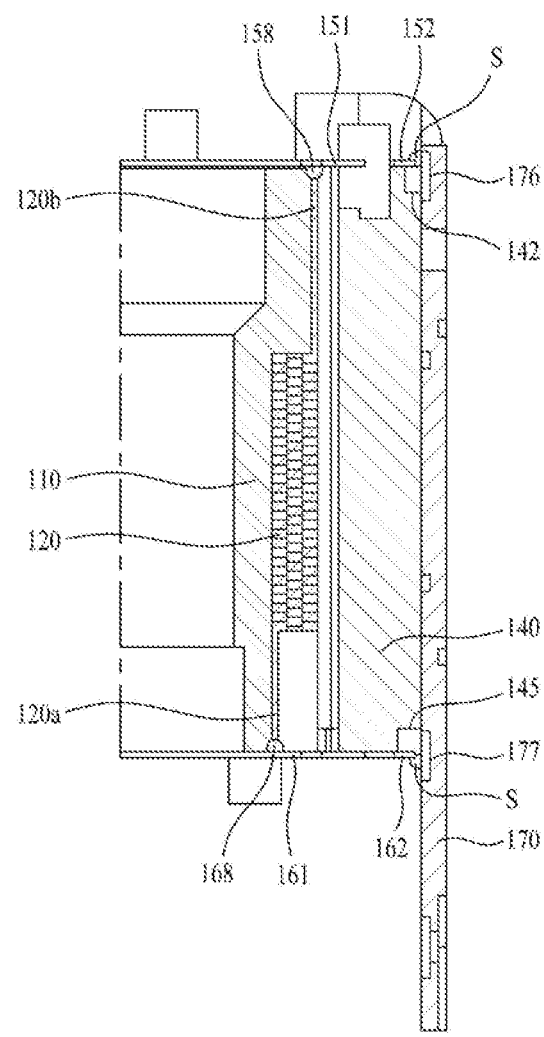
FIG. 19 is a schematic partial longitudinal sectional view illustrating the lens moving apparatus according to one embodiment.

In addition, in the present embodiment, the coil 120 may be wound in three layers around the outer circumferential surface of the bobbin 110 as exemplarily illustrated in FIG. 19. Of course, the coil 120 may be wound in six layers around the outer circumferential surface of the bobbin 110. When the coil is wound around the bobbin in three layers or six layers as described above, one end 120a among both ends of the coil may be located at the lower portion of the bobbin so as to correspond to a position of the lower elastic member and the other end 120a among both ends of the coil may be located at the top of the bobbin so as to correspond to the upper elastic member. In this way, in the present embodiment, connection points of the ends of the coil wound around the bobbin may be allotted respectively to the upper elastic member and the lower elastic member, which may provide a sufficient working space for connection between the coil and the external power source.

The coil 120 serves to move the bobbin 110 in the optical axis direction so as to perform auto-focusing. The coil 120 may create electromagnetic force via electromagnetic interaction with the driving magnets 130 upon receiving current, and the created electromagnetic force may move the bobbin 110.

Meanwhile, the coil 120 may be configured to correspond to the driving magnets 130. When each driving magnet 130 is configured into a unitary body as illustrated such that the entire surface of the driving magnet 130 facing the coil 120 has the same polarity, the coil 120 may be configured such that a surface portion thereof corresponding to the driving magnet 130 has the same polarity. On the other hand, although not illustrated, in the case where each driving magnet 130 is bisected into planes perpendicular to the optical axis such that a surface thereof facing the coil 120 is divided into two or more sections, the coil 120 may also be divided into a plurality of parts equal in number to the divided sections of the driving magnet 130.

The bobbin 110 includes the sensing magnet 190, which is included in the displacement sensing unit along with the position sensor 180 of the housing 140 as described above. The sensing magnet 190 may be fixed or coupled to, or disposed at the bobbin 110. In this way, the sensing magnet 190 may be moved in the first direction by the same displacement as the bobbin 110 when the bobbin 110 is moved in the first direction. In addition, the sensing magnet 190 may be configured into a unitary body and disposed such that the top of the bobbin 110 defines as an N-pole and the lower portion of the bobbin 110 defines an S-pole. However, the embodiment is not limited thereto and the sensing magnet 190 may be configured in the other way. In addition, the sensing magnet 190 may be bisected into planes perpendicular to the optical axis.

Here, as exemplarily illustrated in FIGS. 14 to 18, the bobbin 110 may be provided at the outer circumferential surface thereof with the receiving recess 117 for receiving the sensing magnet 190.

The receiving recess 117 may be indented inward of the bobbin 110 from the outer circumferential surface of the bobbin 110 by a prescribed depth.

Specifically, the receiving recess 117 may be formed in one side of the bobbin 110 such that at least a portion of the receiving recess 117 is located inside the coil 120. In addition, at least a portion of the receiving recess 117 may be indented inward of the bobbin 110 by a prescribed greater depth than a depth of the coil seating recess 116. As the receiving recess 117 is indented inward of the bobbin 110, the sensing magnet 190 may be received in the bobbin 110. As such, space utility of the bobbin 110 may be improved because it is unnecessary to provide a separate installation space for the sensing magnet 190.

In particular, the receiving recess 117 may be located at a position corresponding to a position of the position sensor 180 of the housing 140 (or a position opposite to the position sensor 180). In this way, a distance between the sensing magnet 190 and the position sensor 180 includes a thickness of the coil 120 and a distance between the coil 120 and the position sensor 180 or a distance between the coil 120 and the sensing magnet 190 and may have a minimum value, which may enhance the magnetic force sensing precision of the position sensor 180.

The receiving recess 117 has an opening 119 formed in one of the lower surface and the upper surface of the bobbin 110 so as to communicate with the receiving recess 117. For example, as exemplarily illustrated in FIG. 18, a portion of the lower surface of the bobbin 110 may be open to form the opening 119 and the opening 119 may define an entrance of the receiving recess 117. The sensing magnet 190 may be inserted, placed, or fixed through the opening 119 and may be separated through the opening 119.

More specifically, as exemplarily illustrated in FIGS. 16 to 18, the receiving recess 117 may include an inner surface for supporting one surface of the sensing magnet 190 and an adhesion recess 117b inwardly indented from the inner surface by a prescribed depth so as to allow an adhesive to be injected thereinto.

The inner surface of the receiving recess 117 is an inwardly oriented surface toward the center of the bobbin 110. In the case where the sensing magnet 190 is shaped into a cuboid, a wider surface of the sensing magnet 190 comes into contact with or is seated on the inner surface of the receiving recess 117.

The adhesion recess 117b may be formed as a portion of the inner surface is more deeply indented inward of the bobbin 110 toward the center of the bobbin 110. The adhesion recess 117b may be formed from the opening 119 to an inner surface of the bobbin 110 that comes into contact with one surface of the sensing magnet 190, or on which one surface of the sensing magnet 190 is seated or disposed.

As exemplarily illustrated in FIG. 18, the adhesion recess 117b is provided with a first additional recess 117c and the first additional recess 117c is longer than the sensing magnet 190 in a vertical thickness direction of the bobbin 110. That is, the first additional recess 117c is an extension of the adhesion recess 117b that is more deeply indented than one inner surface of the bobbin 110 that comes into contact with a back surface of the sensing magnet 190, or on which a back surface of the sensing magnet 190 is seated or disposed. Through provision of the first additional recess 117c, when an adhesive is injected into the adhesion recess 117b through the opening 119, the adhesive begins to be charged into the first additional recess 117c to thereby be charged into the adhesion recess 117b. Therefore, it is possible to prevent the adhesive from overflowing the adhesion recess 117b and moving to the coil 120 along a gap between the sensing magnet 190 and the receiving recess 117, which may reduce the defect rate of the lens moving apparatus 100 during coupling of the sensing magnet 190.

In addition, the adhesion recess 117b is further provided with a second additional recess 117a having a prescribed depth in an inward direction from the opening 119 to the center of the bobbin 110. That is, the second additional recess 117a may be more deeply formed in the vicinity of the opening 119 than the inner surface in an inward direction toward the center of the bobbin 110. The second additional recess 117a may be in communication with the adhesion recess 117b. In other words, the second additional recess 117a is an extension of the adhesion recess 117b. Through provision of the second additional recess 117a, an adhesive may be injected into the adhesion recess 117b through the second additional recess 117a. Therefore, it is possible to prevent the adhesive from overflowing in the vicinity of the opening 119 and being adhered to other components of the bobbin 110 such as, for example, the coil 120, which may reduce the defect rate of the lens moving apparatus 100 during coupling of the sensing magnet 190.

In an alternative embodiment, the second additional recess 117a may be formed alone in the bobbin 110 without the adhesion recess 117b. In this case, the bobbin 110 and the sensing magnet 190 may be coupled and fixed to each other as an adhesive is injected into the second additional recess 117a.

The adhesion recess 117b may include at least one of the first additional recess 117c and the second additional recess 117a. That is, the adhesion recess 117b may include only the first additional recess 117c or only the second additional recess 117a.

In an alternative embodiment, a depth between the inner surface of the receiving recess, by which one surface (i.e. a wide surface) of the sensing magnet is supported, and an outer circumferential surface (i.e. a coil seating recess surface) of the receiving recess, around which the coil is wound, may be equal to or less than a thickness of the sensing magnet. In this way, the sensing magnet may be fixed in the receiving recess as the coil inwardly applies pressure thereto during winding thereof. In this case, the adhesive is unnecessary.

In an additional embodiment, although not illustrated in the drawings, the bobbin 110 may further include an additional receiving recess 117 formed in the outer circumferential surface thereof at an opposite position symmetrical to the receiving recess 117 about the center of the bobbin 110 and a weight balance member received in the additional receiving recess 117.

That is, the additional receiving recess 117 is formed in the outer circumferential surface of the bobbin 110 and extends in an inward direction of the bobbin 110 by a prescribed depth at an opposite position linearly symmetrical to the receiving recess 117 about the center of the bobbin 110. In addition, the weight balance member is fixed to and coupled in the additional receiving recess 117 and has the same weight as the sensing magnet 190.

Through provision of the additional receiving recess 117 and the weight balance member, horizontal weight unbalance of the bobbin 110 due to provision of the receiving recess 117 and the sensing magnet 190 may be compensated.

The additional receiving recess 117 may include at least one of the adhesion recess 117b, the first additional recess 117c and the second additional recess 117a.

Figure 20:
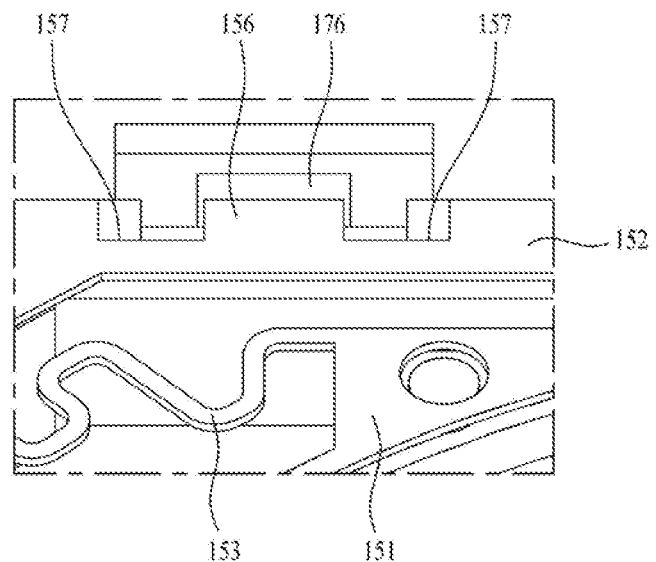
FIG. 20 is a schematic partially enlarged perspective view illustrating an upper portion of the lens moving apparatus according to one embodiment.
Figure 21:
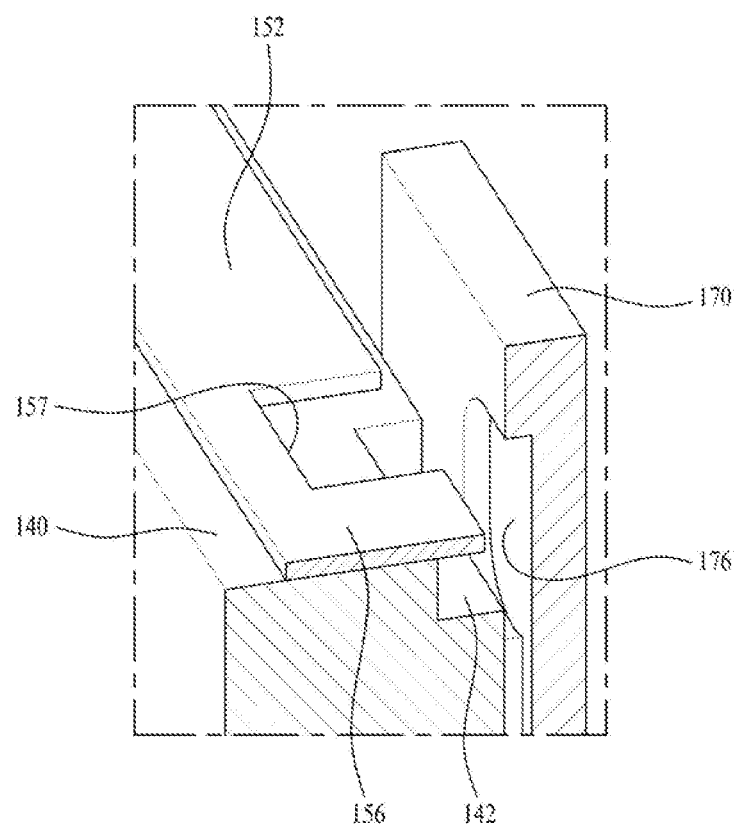
FIG. 21 is a schematic partially cut-away perspective view illustrating the upper portion of the lens moving apparatus illustrated in FIG. 20.
Figure 22:
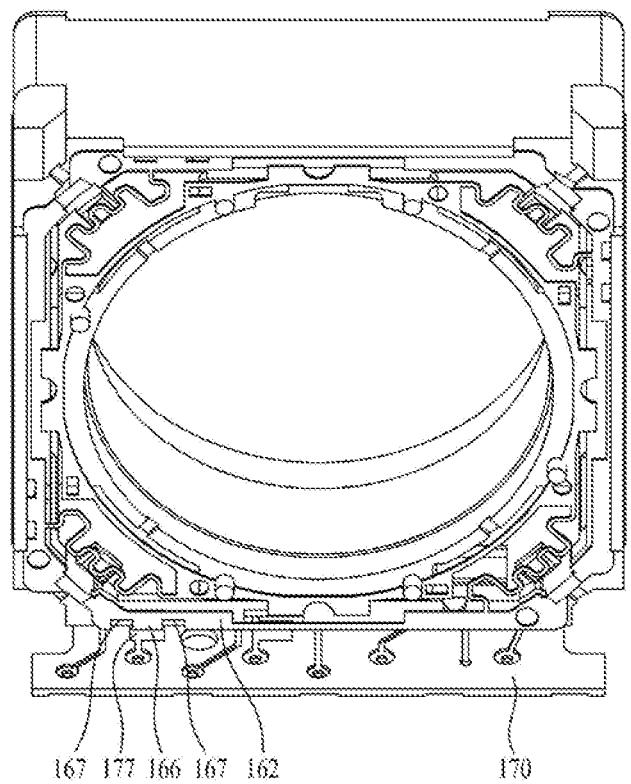
FIG. 22 is a schematic perspective view illustrating a lower portion of the lens moving apparatus according to one embodiment.
Figure 23:
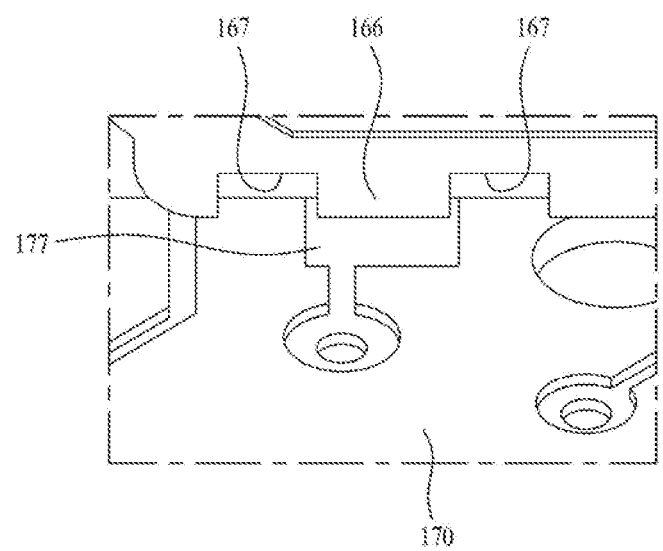
FIG. 23 is a schematic partially enlarged perspective view illustrating the lower portion of the lens moving apparatus according to one embodiment.

FIG. 19 is a schematic partial longitudinal sectional view illustrating the lens moving apparatus according to one embodiment, FIG. 20 is a schematic partially enlarged perspective view illustrating an upper portion of the lens moving apparatus according to one embodiment, FIG. 21 is a schematic partially cut-away perspective view illustrating the upper portion of the lens moving apparatus illustrated in FIG. 20, FIG. 22 is a schematic perspective view illustrating a lower portion of the lens moving apparatus according to one embodiment, and FIG. 23 is a schematic partially enlarged perspective view illustrating the lower portion of the lens moving apparatus according to one embodiment.

The lens moving apparatus, the printed circuit board and the lower elastic member, according to one embodiment of the present embodiment include all constituent elements and technical features included in the lens moving apparatus, the printed circuit board and the lower elastic member according to the embodiments of FIGS. 1A to 18 as described above.

As exemplarily illustrated in FIGS. 19 to 22, the printed circuit board 170 may be coupled to or disposed at one side surface of the housing 140 and have the mounting aperture 173 or recess as described above. In this way, the installation position of the printed circuit board 170 may be guided by the mounting protrusion 149 formed at one side surface of the housing 140.

In addition, the second terminals 171 may be arranged at the printed circuit board 170 so as to be electrically connected to the external power source. The terminals 171 may receive external power and supply current to the position sensor 180. The number of the second terminals 171 formed at the printed circuit board 170 may be reduced or increased according to the kinds of constituent elements that need to be controlled. Meanwhile, according to the present embodiment, the printed circuit board 170 may be a flexible printed circuit board (FPCB). The second terminals 171 may be connected to the external power source and, to this end, may be soldered or brazed to the external power source.

In addition, the printed circuit board 170 may be provided or disposed at, or fixed or coupled to the side surface of the housing 140. That is, the printed circuit board 170 may be disposed, fixed, or provided such that an inner surface (i.e. a surface on which the position sensor 180 is mounted or disposed) of the printed circuit board 170 comes into contact with or faces the exterior side surface of the housing 140.

The printed circuit board 170 further has two avoidance cut-outs 178a and 178b formed in both sides of the lower portion thereof. The two avoidance cutouts 178a and 178b may extend downward from respective positions corresponding to the first terminals 165a and 165b provided at the lower elastic member 160 as described below. In the present embodiment, as described below, the first terminals 165 are distantly spaced apart from each other at one surface of the outer frame. As such, there may be provided the two avoidance cutouts to provide two removal spaces of the respective first terminals.

Here, the first terminals 165a and 165b of the lower elastic member 160 as described below will respectively occupy spaces of the two avoidance cutouts 178a and 178b. In this way, the first terminals 165a and 165b and the second terminals 171 may be arranged at the same side surface of the housing 140 to face downward.

That is, owing to the two avoidance cutouts 178, even when the second terminals 171 of the printed circuit board 170 and the first terminals 165a and 165b of the lower elastic member 160 are arranged at the same side surface of the housing 140, there occurs no spatial interference therebetween.

Accordingly, the first terminals 165a and 165b of the lower elastic member 160 and the second terminals 171 of the printed circuit board 170 may be aligned in a row at the lower end of one side surface of the housing 140 or at one surface of the base 210.

At this time, all of the first terminals 165a and 165b and the second terminals 171 may be disposed or provided to face outward.

By providing the second terminals 171 of the printed circuit board 170 and the first terminals 165a and 165b of the lower elastic member 160 at the same side surface of the housing 140 as described above, the second terminals 171 and the first terminals 165a and 165b may be aligned at one surface of the lens moving apparatus 100, which allows processes of electrically connecting all of the second terminals 171 and the first terminals 165a and 165b to the external power source to be performed in sequence without requiring rotation of the lens moving apparatus 100. As a result, the present embodiment may assist a worker in easily performing a connection process of connecting the printed circuit board and the lower elastic member to the external power source and may considerably reduce a time required for the connection process. In addition, since both ends of the coil 120 of the bobbin 110 should be connected to the lower elastic member rather than being connected to the printed circuit board that provides only a considerably narrow connection working space, easy and rapid implementation of a connection process between the coil and the external power source is impossible.

In addition, the lower elastic member 160, according to an alternative embodiment of the present embodiment, may include the first lower elastic member 160a and the second lower elastic member 160b that are electrically disconnected or spatially separated left and right members as exemplarily illustrated in FIG. 10B. Through this bisection configuration, the first lower elastic member 160a and the second lower elastic member 160b of the lower elastic member 160 may receive different polarities of power or different magnitudes of powers. That is, after the inner frame 161 and the outer frame 162 are coupled respectively to the bobbin 110 and the housing 140, solder balls are provided at positions of the inner frame 161 corresponding to both ends of the coil 120 wound around the bobbin 110 such that the inner frame 161 and the outer frame 162 may receive different polarities of power or different magnitudes of powers via current carrying connection, such as, for example, soldering, at the solder balls. In addition, the first lower elastic member 160a may be electrically connected to one of both ends of the coil 120 and the second lower elastic member 160b may be electrically connected to the other end of the coil 120 so as to receive current and/or a voltage from the external power source.

Here, the first lower elastic member 160a and the second lower elastic member 160b, which are electrically separated from each other, respectively include the first terminals 165a and 165b that are electrically connected to the external power source to supply external power to the ends of the coil.

The first terminals 165a and 165b of the lower elastic members 160a and 160b and the second terminals 171 of the printed circuit board 170 may be arranged at the same side surface of the housing 140 to face downward.

In addition, as exemplarily illustrated in FIG. 23, the first terminals 165a and 165b may extend outward from one surface of the outer frame 162 and be bent downward. At this time, each of the first terminals 165a and 165b may have a rectangular plate shape.

In addition, according to the present embodiment, the first terminals 165a and 165b may be located respectively at edges of one surface of the outer frame 162. Thereby, as described above, to prevent spatial interference between the first terminals 165a and 165b and the printed circuit board 170, the printed circuit board 170 may have the two avoidance cutouts 178a and 178b.

In addition, the first terminals 165a and 165b may respectively have the cutouts 166a and 167a formed in at least one of both side surfaces of a bending portion. Through provision of the cutouts, after the lower elastic member 160 is fixed to, disposed at, or coupled to the lower portions of the bobbin 110 and the housing 140, the first terminals 165a and 165b may be easily bent relative to the outer frames 162, which may facilitate an assembly process of the lens moving apparatus.

Of course, conversely, the lower elastic member may be fixed to, disposed at, or coupled to the lower portions of the bobbin and the housing after the first terminals are first bent.

Then, one of both ends of the coil may be electrically connected, brazed, or soldered to a portion of the inner frame 161 of the first lower elastic member 160a and the other end of the coil may be electrically connected, brazed, or soldered to a portion of the inner frame 161 of the second lower elastic member 160b.

With the configuration as described above, the present embodiment may collectively align connection points between the lens moving apparatus and the external power source at one surface of the lens moving apparatus, which may facilitate easy connection between the lens moving apparatus and the external power source.

In the present embodiment, by collectively aligning connection points between the lens moving apparatus and the external power source at one surface of the lens moving apparatus, a time required for connection between the lens moving apparatus and the external power source may be considerably reduced, which may result in improved productivity of the lens moving apparatus and an electronic appliance to which the lens moving apparatus is mounted.

In addition, the camera module may further include a camera module controller. The camera module controller compares a focal distance of a lens depending on a distance between an imaging target object and the lens with a first displacement value calculated based on a current variation sensed by the displacement sensing unit. Thereafter, when the first displacement value or a current position of the lens does not correspond to the focal distance of the lens, the camera module controller may reregulate the amount of current applied to the coil 120 of the bobbin 110 to move the bobbin 110 in the first direction by a second displacement. In the displacement sensing unit, as the sensing magnet 190 fixedly coupled to the bobbin 110 as a moving body is moved in the first direction, the position sensor 180 fixedly coupled to the housing 140 as a stationary element senses variation in magnetic force emitted from the sensing magnet 190. Based on variation in the amount of current output according to the sensed variation in magnetic force, a separate driver IC or the camera module controller may calculate or judge a current position of the bobbin 110 or the first displacement. As the current position of the bobbin 110 or the first displacement calculated or judged by the displacement sensing unit is transmitted to the controller of the printed circuit board 170, the controller may again determine a position of the bobbin 110 for auto-focusing and adjust the amount of current to be applied to the coil 120.

As exemplarily illustrated in FIGS. 9 and 10 and FIGS. 19 to 23, the upper elastic member 150 includes the inner frame 151 coupled to the upper surface of the bobbin 110, the outer frame 152 coupled to the upper surface of the housing 140, and the connector 153 that elastically connects the inner frame 151 and the outer frame 152 to each other. In addition, the lower elastic member 160 includes the inner frame 161 coupled to the lower surface of the bobbin 110, the outer frame 162 coupled to the lower surface of the housing 140, and the connector 163 that elastically connects the inner frame 161 and the outer frame 162 to each other.

One end 120a of both ends of the coil 120 may be electrically connected to the inner frame 161 of the lower elastic member 160 and the other end 120b of both ends of the coil 120 may be electrically connected to the inner frame 151 of the upper elastic member 150. At this time, one end 120a and the other end 120b may be electrically connected respectively to the inner frame 161 of the lower elastic member 160 and the inner frame 151 of the upper elastic member 150 through connection portions 168 and 158 (for example, solder balls).

As exemplarily illustrated in FIGS. 19 to 23, the upper elastic member 150 may be electrically connected to one of the input terminal 174 and the output terminal 178 of the printed circuit board 170 and the lower elastic member 160 may be electrically connected to the other one of the input terminal 174 and the output terminal 178 of the printed circuit board 170. Hereinafter, for clarity of description, the case where the lower elastic member 160 is electrically connected to the input terminal 174 and the upper elastic member 150 is electrically connected to the output terminal 178 will be described.

At this time, the input terminal 174 may be electrically connected to the lower connection terminal 177 via one printed circuit 174a in the printed circuit board 170.

The input terminal 174 may be oriented outward at the lower portion of the printed circuit board 170 when the printed circuit board 170 is coupled or fixed to, or disposed at one side surface of the housing 140.

The lower connection terminal 177 may be provided at the inner surface of the printed circuit board 170 at the same height as or at a different height than that of the lower elastic member 160 and may be electrically connected to the lower elastic member 160. Here, the lower connection terminal 177 and the lower elastic member 160 may be connected to each other via current carrying connection means S (for example, solder balls).

The output terminal 178 may be electrically connected to the upper connection terminal 176 via another printed circuit 178a in the printed circuit board 170.

The output terminal 178 may be oriented outward at the lower portion of the printed circuit board 170 when the printed circuit board 170 is coupled or fixed to, or disposed at one side surface of the housing 140. That is, the output terminal 178 may be located at the same height as that of the input terminal 174 so as to be aligned in a row in parallel with each other.

The upper connection terminal 176 may be provided at the inner surface of the printed circuit board 170 at the same height as or at a different height than that of the upper elastic member 150 and may be electrically connected to the upper elastic member 150. Here, the upper connection terminal 176 and the upper elastic member 150 may be connected to each other via current carrying connection means S (for example, solder balls).

The outer frame 152 of the upper elastic member 150 may be provided with the first intermediate terminal 156 to facilitate easy electrical contact between the upper connection terminal 176 of the printed circuit board 170 and the outer frame 152 of the upper elastic member 150.

The first intermediate terminal 156 may horizontally extend from the outer frame 152 of the upper elastic member 150.

At this time, the first intermediate terminal 156 may be located at one side surface of the outer frame 152 of the upper elastic member 150 facing the inner surface of the printed circuit board 170. Specifically, the first intermediate terminal 156 may be located at a position corresponding to a position of the upper connection terminal 176 of the printed circuit board so as to face or come into contact with the upper connection terminal 176.

The first intermediate terminal 156 may be electrically connected to the upper connection terminal 176 of the printed circuit board 170 via current carrying connection means S (for example, solders).

At this time, an end of the first intermediate terminal 156 may be located at the same line as an outer surface of the outer frame 152 of the upper elastic member 150 or may be located outward of the outer surface of the outer frame 152.

The first intermediate terminal 156 is provided at both side surfaces thereof with path delimiting cutouts 157 that are formed by cutting out outer portions of the outer frame 152. That is, the outer frame 152 may have the two path delimiting cutouts 157 laterally spaced apart from each other by a prescribed distance and the first intermediate terminal 156 defined by the prescribed distance.

As a result of forming the path delimiting cutouts 157 as described above, in the present embodiment, during connection between the first intermediate terminal 156 of the upper elastic member 150 and the upper connection terminal 176 of the printed circuit board 170 via current carrying connection means, the flow path of a fluidal conductive material (for example, a soldering solution when the connection process is performed by soldering) may be delimited to allow the fluidal conductive material to flow in the first intermediate terminal 156, which may prevent the high temperature fluidal conductive material from reaching components other than the terminal.

In addition, the housing 140 has a first avoidance cutout 142 having a prescribed depth from the lower portion of the first intermediate terminal 156, the first avoidance cutout 142 being formed in the outer surface of the housing 140 facing the inner surface of the printed circuit board 170. That is, the first avoidance cutout 142 may be formed in the upper surface of the housing 140 by a prescribed width to extend downward from the bottom of the first intermediate terminal 156 by a prescribed depth. In addition, the first avoidance cutout 142 may further extend to the outer side surface of the housing 140.

The width of the first avoidance cutout 142 may be greater than the width of the first intermediate terminal 156.

Through provision of the first avoidance cutout 142, in the present embodiment, during connection between the first intermediate terminal 156 of the upper elastic member 150 and the upper connection terminal 176 of the printed circuit board 170 via current carrying connection means, it is possible to prevent the outer side surface of the housing 140 from melting due to heat emitted from the fluidal conductive material (for example, a soldering solution when the connection process is performed by soldering). That is, the first avoidance cutout 142 may spatially isolate the first intermediate terminal 156 to which high temperature heat is transferred from the fluidal conductive material from a portion of the outer side surface of the housing 140 and define a cooling space for the fluidal conductive material below the first intermediate terminal 156, which may remarkably reduce the defect rate of the housing 140 that may be caused during connection between the first intermediate terminal 156 of the upper elastic member 150 and the upper connection terminal 176 of the printed circuit board 170.

The outer frame 162 of the lower elastic member 160 may be provided with the second intermediate terminal 166 to facilitate easy electrical contact between the lower connection terminal 177 of the printed circuit board 170 and the outer frame 162 of the lower elastic member 160.

The second intermediate terminal 166 may horizontally extend from the outer frame 162 of the lower elastic member 160.

At this time, the second intermediate terminal 166 may be located at one side surface of the outer frame 162 of the lower elastic member 160 facing the inner surface of the printed circuit board 170. Specifically, the second intermediate terminal 166 may be located at a position corresponding to a position of the lower connection terminal 177 of the printed circuit board 170 so as to face or come into contact with the lower connection terminal 177.

The second intermediate terminal 166 may be electrically connected to the lower connection terminal 177 of the printed circuit board 170 via current carrying connection means S (for example, solder balls).

At this time, an end of the second intermediate terminal 166 may be located at the same line as an outer surface of the outer frame 162 of the lower elastic member 160 or may be located outward of the outer surface of the outer frame 162.

The second intermediate terminal 166 is provided at both side surfaces thereof with path delimiting cutouts 167 that are formed by cutting out outer portions of the outer frame 162. That is, the outer frame 162 may have the two path delimiting cutouts 167 laterally spaced apart from each other by a prescribed distance and the second intermediate terminal 166 defined by the prescribed distance.

As a result of forming the path delimiting cutouts 167 as described above, in the present embodiment, during connection between the second intermediate terminal 166 of the lower elastic member 160 and the lower connection terminal 177 of the printed circuit board 170 via current carrying connection means, the flow path of a fluidal conductive material (for example, a soldering solution when the connection process is performed by soldering) may be delimited to allow the fluidal conductive material to flow in the second intermediate terminal 166, which may prevent the high temperature fluidal conductive material from reaching components other than the terminal.

In addition, the housing 140 has a second avoidance cutout 145 having a prescribed height from the top of the second intermediate terminal 166, the second avoidance cutout 145 being formed in the outer surface of the housing 140 facing the inner surface of the printed circuit board 170. That is, the second avoidance cutout 145 may be formed in the lower surface of the housing 140 by a prescribed width and a prescribed height upward from above the second intermediate terminal 166. In addition, the second avoidance cutout 145 may further extend to the outer side surface of the housing 140.

The width of the second avoidance cutout 145 may be greater than the width of the second intermediate terminal 166.

Through provision of the second avoidance cutout 145, in the present embodiment, during connection between the second intermediate terminal 166 of the lower elastic member 160 and the lower connection terminal 177 of the printed circuit board 170 via current carrying connection means, it is possible to prevent the outer side surface of the housing 140 from melting due to heat emitted from the fluidal conductive material (for example, a soldering solution when the connection process is performed by soldering). That is, the second avoidance cutout 145 may spatially isolate the second intermediate terminal 166 to which high temperature heat is transferred from the fluidal conductive material from a portion of the outer side surface of the housing 140 and define a cooling space for the fluidal conductive material below the second intermediate terminal 166, which may remarkably reduce the defect rate of the housing 140 that may be caused during connection between the second intermediate terminal 166 of the lower elastic member 160 and the lower connection terminal 177 of the printed circuit board 170.

According to the present embodiment, input and output of external power to and from the coil 120 are as follows.

First, current supplied from the external power source may pass through the input terminal 174 of the printed circuit board 170 and then be supplied to the second intermediate terminal 166 of the outer frame 162 of the lower elastic member 160 by way of one printed circuit 174a and the lower connection terminal 177 of the printed circuit board 170. Subsequently, the supplied current may be supplied to one end 120a of both ends of the coil 120 from the second intermediate terminal 166 by passing through the outer frame 162, the connector 163 and the inner frame 161 of the lower elastic member 160. Subsequently, the supplied current having passed throughout the coil 120 is directed to the inner frame of the upper elastic member 150 through the other end 120b of both ends of the coil 120. Subsequently, the supplied current passes through the inner frame 151 and the connector 153 of the upper elastic member 150 and the first intermediate terminal 156 of the outer frame 152. Finally, the supplied current having passed through the first intermediate terminal 156 is directed to the output terminal 178 of the printed circuit board 170 by way of the upper connection terminal 176 and another printed circuit 178a of the printed circuit board to thereby return to the external power source.

As is apparent from the above description, according to the present embodiment, as both ends of a coil are separately arranged at upper and lower positions so as to be electrically connected to a printed circuit board through an upper elastic member and a lower elastic member, an external power source may be electrically connected to the coil using the printed circuit board as an intermediate connection means. In this way, according to the present embodiment, both ends of the coil wound around a bobbin may be arranged respectively at the upper elastic member and the lower elastic member, which may result in a sufficient working space for connection between the coil and the external power source.

In addition, according to the present embodiment, by simply forming path delimiting cutouts in outer frames of the upper elastic member and the lower elastic member, the upper elastic member and the lower elastic member may be used as the intermediate connection means for the coil without requiring addition of separate components to the upper elastic member and the lower elastic member. In this way, according to the present embodiment, a working space for connection between the coil of the bobbin and the external power source that supplies current to the coil may be attained without an increase in the manufacturing price of the upper elastic member and the lower elastic member.

In addition, according to the present embodiment, during connection between the coil and the external power source, it is possible to prevent a fluidal conductive material, for example, a soldering solution (when the connection process is soldering), from reaching components other than terminals. In this way, according to the present embodiment, it is possible to prevent a basic material such as, for example, a housing or printed circuit board, from being molten or damaged by the high temperature fluidal conductive material generated during the connection process, which may considerably reduce the defect rate of the lens moving apparatus.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
a housing;
a base disposed below the housing;
a bobbin disposed in the housing and including a recess inwardly formed from an outer circumferential surface thereof, wherein the bobbin is configured to be moved in a first direction along or parallel to an optical axis within the housing;
a driving magnet disposed on the housing;
a coil provided at the outer circumferential surface of the bobbin and located inside the driving magnet;
an elastic member coupled to the bobbin and supporting the bobbin;
a printed circuit board provided at one side surface of the housing; and
a sensing magnet disposed in the recess of the bobbin and coupled to the bobbin,
wherein a portion of the recess is located inside the coil.

2. The lens moving apparatus according to claim 1, wherein the elastic member comprises a lower elastic member coupled to a lower portion of the bobbin and an upper elastic member coupled to an upper portion of the bobbin, and each of the upper elastic member and the lower elastic member comprises an inner frame coupled to the bobbin, an outer frame spaced from the inner frame, and a connector connecting the inner frame and the outer frame, and
wherein the outer frame of the upper elastic member is coupled to the housing using an adhesive or via fusion, and the inner frame of the upper elastic member is coupled to the bobbin using an adhesive or via fusion.

3. The lens moving apparatus according to claim 2, wherein a plurality of upper frame support bosses protrude from a top of the housing, first through-holes or recesses having a shape corresponding to a shape of the upper frame support bosses are formed at the outer frame of the upper elastic member, and the upper frame support bosses are coupled with the first through-holes or the recesses.

4. The lens moving apparatus according to claim 2, wherein a plurality of lower frame support bosses protrude from a lower portion of the housing, insertion recesses or holes having a shape corresponding to a shape of the lower frame support bosses are formed at the outer frame of the lower elastic member, and the lower frame support bosses are coupled with the insertion recesses or the holes.

5. The lens moving apparatus according to claim 1, wherein the printed circuit board comprises an input terminal and an output terminal configured to be electrically connected to an external power source, and wherein the elastic member is electrically connected to one terminal among the input terminal and the output terminal.

6. The lens moving apparatus according to claim 5, comprising:
a position sensor disposed at a position corresponding to the sensing magnet, wherein the position sensor is configured to sense a displacement of the sensing magnet in the first direction.

7. The lens moving apparatus according to claim 6, wherein the position sensor is mounted on a printed circuit board, and the printed circuit board comprises a plurality of terminals configured to be electrically connected to an external power source.

8. The lens moving apparatus according to claim 7, wherein the printed circuit board comprises a flexible printed circuit board.

9. The lens moving apparatus according to claim 8, wherein the plurality of terminals of the flexible printed circuit board is disposed on the base.

10. The lens moving apparatus according to claim 6, wherein the position sensor is disposed inside the printed circuit board.

11. The lens moving apparatus according to claim 6, wherein the position sensor is a hall sensor.

12. The lens moving apparatus according to claim 1, comprising a weight balance member apposite the sensing magnet.

13. The lens moving apparatus according to claim 1, wherein the driving magnet is configured into a cuboid having a constant width and arranged along a side surface of the housing.

14. The lens moving apparatus according to claim 13, wherein the driving magnet is provided in plurality, the driving magnets facing each other being installed in parallel with each other and arranged to face the coil.

15. The lens moving apparatus according to claim 13, wherein the driving magnet is arranged to face the coil, and the driving magnet is oriented in such a way that one surface facing the coil defines an N-pole and an opposite outer surface thereof defines an S-pole or, oriented in an opposite way thereof.

16. The lens moving apparatus according to claim 13, wherein the driving magnet is arranged to face the coil, and the driving magnet is bisected into planes perpendicular to the first direction.

17. The lens moving apparatus according to claim 1, wherein the coil is wound around the outer circumferential surface of the bobbin by an even number of turns.

18. The lens moving apparatus according to claim 1, wherein the coil is wound around the outer circumferential surface of the bobbin in three layers or in six layers.

19. A camera module comprising the lens moving apparatus according to claim 1.

20. A cellular phone comprising the camera module according to claim 19.

21. The lens moving apparatus according to claim 1, wherein a portion of the sensing magnet is disposed between the bobbin and the coil.

22. The lens moving apparatus according to claim 1, wherein the bobbin includes a coil seating recess formed around the outer circumferential surface thereof.

23. A lens moving apparatus comprising:
a housing;
a base disposed below the housing;
a bobbin disposed in the housing and including a recess inwardly formed from an outer circumferential surface thereof, wherein the bobbin is configured to be moved in a first direction along or parallel to an optical axis within the housing;
a driving magnet disposed on the housing;
a coil provided at the outer circumferential surface of the bobbin and located inside the driving magnet;
an elastic member coupled to the bobbin and supporting the bobbin, wherein the elastic member comprises a lower elastic member coupled to a lower portion of the bobbin;
a printed circuit board provided at one side surface of the housing; and
a sensing magnet disposed in the recess of the bobbin and coupled to the bobbin,
wherein the PCB comprises a cutout portion exposing the lower elastic member in a lateral direction perpendicular to the one side surface of the housing.

* * * * *